United States Patent
Hyodo et al.

(10) Patent No.: US 9,438,880 B2
(45) Date of Patent: Sep. 6, 2016

(54) IMAGE PROCESSING APPARATUS, IMAGE PROCESSING METHOD, AND PROGRAM

(71) Applicant: Sony Corporation, Tokyo (JP)

(72) Inventors: Yasuhide Hyodo, Tokyo (JP); Shuichi Takahashi, Kanagawa (JP); Satoshi Shioiri, Miyagi (JP)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 14/591,046

(22) Filed: Jan. 7, 2015

(65) Prior Publication Data

US 2015/0201185 A1 Jul. 16, 2015

(30) Foreign Application Priority Data

Jan. 14, 2014 (JP) ................................. 2014-004260

(51) Int. Cl.
*H04N 13/00* (2006.01)

(52) U.S. Cl.
CPC ...... *H04N 13/0037* (2013.01); *H04N 13/0022* (2013.01); *H04N 13/0018* (2013.01)

(58) Field of Classification Search
CPC ..................... H04N 13/0018; H04N 13/0022; H04N 13/0037
USPC ........................................................ 382/154
See application file for complete search history.

(56) References Cited

U.S. PATENT DOCUMENTS 8,243,089 B2 * 8/2012 Marks ...................... G06F 3/14
345/426

FOREIGN PATENT DOCUMENTS

| JP | 2001-238231 A | 8/2001 |
| JP | 2011-113363 A | 6/2011 |
| JP | 2012-247891 A | 12/2012 |

* cited by examiner

*Primary Examiner* — Stephen R Koziol
*Assistant Examiner* — Shaghayegh Azima
(74) *Attorney, Agent, or Firm* — Wolf, Greenfield & Sacks, P.C.

(57) ABSTRACT

There is provided an image processing apparatus that includes a depth-adjustment-amount determination section configured to determine a depth adjustment amount of an input image, an evaluation function storage section configured to store an evaluation function, the evaluation function representing a relationship of a subjective depth amount of the image to a color-saturation component thereof, the subjective depth amount being a depth amount subjectively felt by a user, an input-value-adjustment-amount determination section configured to determine an input-value adjustment amount based on the evaluation function, the input-value adjustment amount representing a retina's response to the color-saturation component corresponding to the determined depth adjustment amount, an adjustment gain calculation section configured to calculate each spatial-frequency-component adjustment gain based on the determined input-value adjustment amount, and a gain superimposition section configured to superimpose each of the calculated spatial-frequency-component adjustment gains on the color-saturation component of the input image.

20 Claims, 22 Drawing Sheets

FIG.12

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2014-004260 filed Jan. 14, 2014, the entire contents of which are incorporated herein by reference.

BACKGROUND

The present disclosure relates to image processing apparatuses, image processing methods, and programs and, more specifically, to an image processing apparatus, an image processing method, and a program that produce the effect of depth control without degrading the image quality.

For people to perceive the three-dimensional (3D) form and the depth of an object, information for use includes binocular stereo information with two eyes and monocular stereo information with one eye. People use both the binocular and monocular stereo information to perceive the 3D form and the depth of an object and of a space. The binocular stereo information includes binocular parallax, horizontal convergence, and others, and the monocular stereo information includes shading, contrast, color, spatial frequency, shielding status, and others.

For enhancing the 3D form and the depth of an object in an image displayed on a two-dimensional (2D) display to let a viewer perceive that the image is 3D, the image may be displayed with a larger binocular parallax being the binocular stereo information, for example.

However, displaying the object image with a larger binocular parallax causes problems as below considering the human eyeball structure and the visual performance. That is, the human eyeballs are normally converged inwardly rather than being parallel. Therefore, when the binocular parallax becomes larger than the pupil distance, this causes the eyeballs to diverge outward. The pupil distance varies depending on the age and sex of viewers, and as to viewers whose pupil distance is narrower than others, their eyeballs are easily diverged.

Therefore, displaying an image with a larger binocular parallax to enhance the 3D form and the depth of an object therein may easily cause eye strain.

In consideration thereof, proposed is to use the monocular stereo information to enhance the 3D form and the depth of an object. As an example, Japanese Patent Application Laid-Open No. 2001-238231 proposes to enhance the depth of an object by changing how the object looks depending on the depth position of the object in an image, e.g., changing shading, shielding status, and a degree of blurring.

In Japanese Patent Application Laid-Open No. 2001-238231, however, there is no specific description about how to set which parameter value based on which calculation equation. Parameter value setting with trial and error offers no guarantee that the resulting right- and left-eye images look natural for viewers and cause them no eye strain, or rather the images may not look natural for the viewers and cause them discomfort or eye strain.

In order to solve such problems, the applicant of the present application proposes technologies of quantifying the relationship between the monocular stereo information and the depth perception, and controlling the 3D form and the depth of an object using the quantitative relationship (Japanese Patent Application Laid-Open Nos. 2011-113363 and 2012-247891). Japanese Patent Application Laid-Open No. 2011-113363 specifically describes the technology of quantifying the relationship between the contrast and the depth perception, and controlling the 3D form and the depth of an object by contrast adjustment using the quantitative relationship. Japanese Patent Application Laid-Open No. 2012-247891 specifically describes the technology of quantifying the relationship between the contrast/spatial frequency and the depth perception, and controlling the depth of an object by contrast adjustment on a spatial frequency basis using the quantitative relationship.

SUMMARY

With the technologies of Japanese Patent Application Laid-Open Nos. 2011-113363 and 2012-247891, however, the contrast for use in processing is only luminance information about images, and no consideration is given to color information. This thus results in a limitation of producing the effect of depth control without degrading the image quality.

It is thus desirable to produce the effect of depth control without degrading the image quality.

According to an embodiment of the present disclosure, there is provided an image processing apparatus including a depth-adjustment-amount determination section, an evaluation function storage section, an input-value-adjustment-amount determination section, an adjustment gain calculation section, and a gain superimposition section. The depth-adjustment-amount determination section is configured to determine a depth adjustment amount of an input image. The evaluation function storage section is configured to store an evaluation function, the evaluation function representing a relationship of a subjective depth amount of the image to a color-saturation component thereof, the subjective depth amount being a depth amount subjectively felt by a user. The input-value-adjustment-amount determination section is configured to determine an input-value adjustment amount based on the evaluation function, the input-value adjustment amount representing a retina's response to the color-saturation component corresponding to the determined depth adjustment amount. The adjustment gain calculation section is configured to calculate each spatial-frequency-component adjustment gain based on the determined input-value adjustment amount. The gain superimposition section is configured to superimpose each of the spatial-frequency-component adjustment gains on the color-saturation component of the input image, the adjustment gain being calculated by the adjustment gain calculation section.

According to an embodiment of the present disclosure, there is provided an image processing method, including, by an image processing apparatus configured to process an input image, determining a depth adjustment amount of the input image, determining an input-value adjustment amount based on an evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount, calculating each spatial-frequency-component adjustment gain based on the determined input-value adjustment amount, and superimposing each of the calculated spatial-frequency-component adjustment gains on the color-saturation component of the input image.

According to an embodiment of the present disclosure, there is provided a program causing a computer to function as a depth-adjustment-amount determination section, an input-value-adjustment-amount determination section, an adjustment gain calculation section, and a gain superimposition section. The depth-adjustment-amount determination section is configured to determine a depth adjustment amount of an input image. The input-value-adjustment-amount determination section is configured to determine an input-value adjustment amount based on the evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount. The adjustment gain calculation section is configured to calculate each spatial-frequency-component adjustment gain based on the determined input-value adjustment amount. The gain superimposition section is configured to superimpose each of the calculated spatial-frequency-component adjustment gains on the color-saturation component of the input image.

According to an embodiment of the present disclosure, a depth adjustment amount of an input image is determined. An input-value adjustment amount is determined based on the evaluation function, the input-value adjustment amount representing a retina's response to the color-saturation component corresponding to the determined depth adjustment amount. An adjustment gain at each spatial frequency component is calculated based on the determined input-value adjustment amount. The adjustment gain is superimposed on the color-saturation component of the input image, the adjustment gain being calculated at each of the spatial frequency components calculated by the adjustment gain calculation section.

The program may be provided by transmission via a transmission medium, or by being recorded on a recording medium.

The image processing apparatus may be an independent apparatus, or may be an internal block configuring an apparatus.

According to an embodiment of the present disclosure, the effect of depth control is produced without degrading the image quality.

The effect described herein is not necessarily restrictive, and may be any effect described in this Specification.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 12 is a diagram illustrating an exemplary result of image processing;

DETAILED DESCRIPTION OF EMBODIMENTS

Hereinafter, embodiments of the present disclosure (hereinafter, simply referred to as embodiments) will be described with reference to the drawings. The description is given in the following order.

1. First Embodiment (exemplary configuration for depth control by adjusting luminance contrast and color saturation of an image)

2. Second Embodiment (exemplary configuration for depth control by adjusting only color saturation of an image)

3. Third Embodiment (example of depth control over a 2D image)

[1. First Embodiment]

[Quantitative Relationship Between Luminance Contrast/Color Saturation of Image and Depth Perception] With an image processing apparatus that will be described below, an image is adjusted in luminance contrast and color saturation to adjustably change the user's depth perception when he/she views the image.

Described first is the quantitative relationship between the luminance contrast/color saturation in an image and the depth perception.

Figure 1:
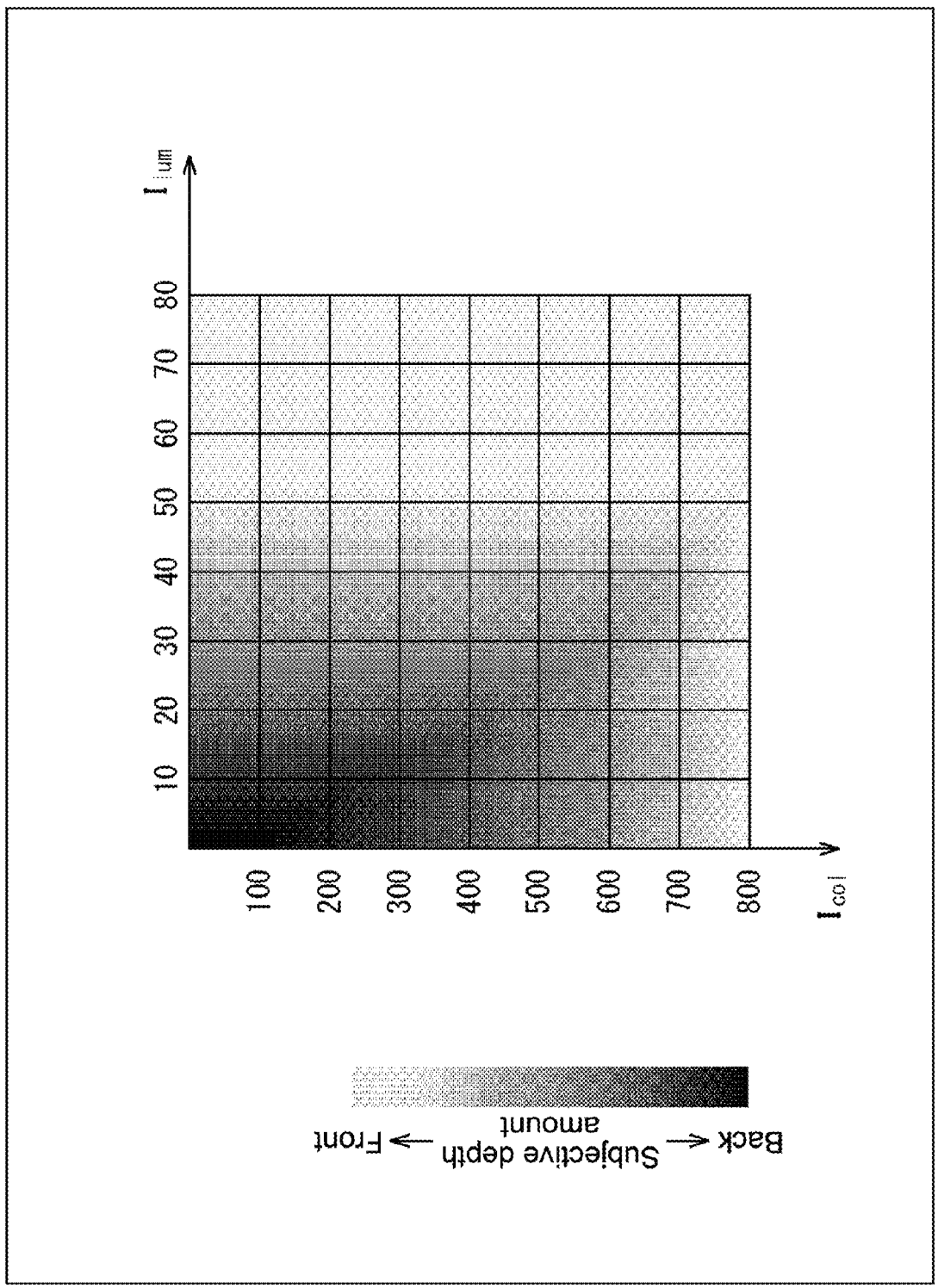
FIG. 1 is a diagram showing the quantitative relationship between luminance contrast/color saturation in an image and depth perception.

FIG. 1 is a diagram showing the quantitative relationship between the luminance contrast/color saturation in an image and the depth perception obtained by visual tests.

In FIG. 1, the X axis indicates a retina's response $I_{lum}$ to luminance contrast, and the Y axis indicates a retina's response $I_{col}$ to color saturation. The XY plane of FIG. 1 is mapped in grayscale with a subjective depth amount $D(I_{lum}, I_{col})$ at coordinates of $(I_{lum}, I_{col})$. The subjective depth amount $D(I_{lum}, I_{col})$ indicates that the lighter grayscale makes the user feel that the object is positioned more toward the front.

FIG. 1 shows that the higher luminance contrast or the higher color saturation obtains lighter shades of gray. That is, an object is perceived as being toward the front when the luminance contrast or the color saturation is high.

Such a relationship between the luminance contrast/color saturation in an image and the depth perception is confirmed by visual tests.

Described next in detail are the retina's response $I_{lum}$, to luminance contrast, and the retina's response $I_{col}$ to color saturation.

The retina's response $I_{lum}$ to luminance contrast on the X axis is defined by Equation 1 below.
[Math. 1]

$$I_{lum} = \int_{\omega \in \Omega} E_{lum}(\omega) S_{lum}(\omega) d\omega \tag{1}$$

In Equation 1, $\omega$ denotes a spatial frequency (cpd (cycle per degree), $\Omega$ denotes a set of spatial frequencies (including no direct current (DC) component) in a local area, e.g., rectangular area of M×N pixels, $E_{lum}(\omega)$ denotes depth efficiency with luminance contrast at the spatial frequency $\omega$, and $S_{lum}(\omega)$ denotes the luminance contrast at the spatial frequency $\omega$, i.e., each spatial frequency spectrum in luminance components. The luminance contrast $S_{lum}(\omega)$ at the spatial frequency $\omega$ is obtained by Fourier transform on the local area.

The depth efficiency $E_{lum}(\omega)$ corresponds to the weight of a predetermined spatial frequency $\omega$(cpd), and Equation 1 indicates that the retina's response $I_{lum}$ to luminance contrast is able to be represented by a combination of contrast at a plurality of weighted spatial frequencies.

The depth efficiency $E_{lum}(\omega)$ with luminance contrast is represented by Equation 2 below.
[Math. 2]

$$E_{lum}(\omega) = \exp(-\omega^2/51.84) \tag{2}$$

Figure 2:
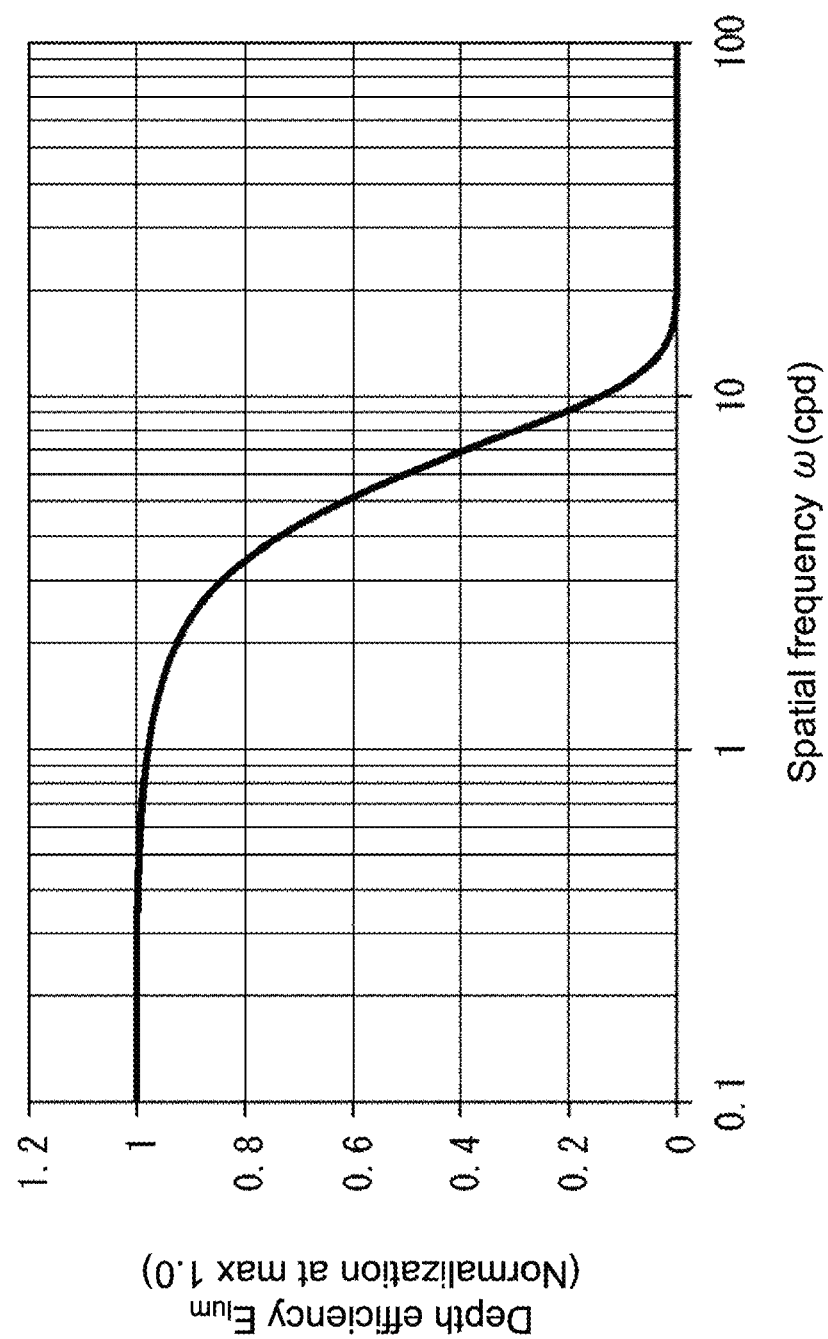
FIG. 2 is a diagram showing depth efficiency $E_{lum}(\omega)$ with luminance contrast.

FIG. 2 is a graph of the depth efficiency $E_{lum}(\omega)$ with the luminance contrast in Equation 2.

As shown in FIG. 2, the lower the spatial frequency $\omega$, the higher the depth efficiency $E_{lum}(\omega)$ with luminance contrast becomes, and the higher the spatial frequency $\omega$, the lower the depth efficiency $E_{lum}(\omega)$ with luminance contrast becomes, i.e., like a visual filter with low-pass characteristics.

The retina's response $I_{col}$ to color saturation is represented by Equation 3 below.
[Math. 3]

$$I_{col} = \int_{\omega \in \Omega'} E_{col}(\omega) S_{col}(\omega) d\omega \tag{3}$$

In Equation 3, $\omega$ denotes a spatial frequency (cpd), $\Omega'$ denotes a set of spatial frequencies (including DC components) in a local area, $E_{col}(\omega)$ denotes depth efficiency with color saturation at the spatial frequency $\omega$, and $S_{col}(\omega)$ denotes the color saturation at the spatial frequency W, i.e., each spatial frequency spectrum in color-saturation components. The color saturation $S_{col}(\omega)$ at the spatial frequency $\omega$ is obtained by Fourier transform on the local area.

Similarly to the luminance contrast, the depth efficiency $E_{col}(\omega)$ corresponds to the weight of a predetermined spatial frequency $\omega$(cpd), and Equation 3 indicates that the retina's response $I_{col}$ to color saturation is able to be represented by a combination of color saturation at a plurality of weighted spatial frequencies.

The depth efficiency $E_{col}(\omega)$ with color saturation is represented by Equation 4 below.

[Math. 4]

$$E_{col}(\omega) = \exp(-\omega^2/56.85) \tag{4}$$

Figure 3:
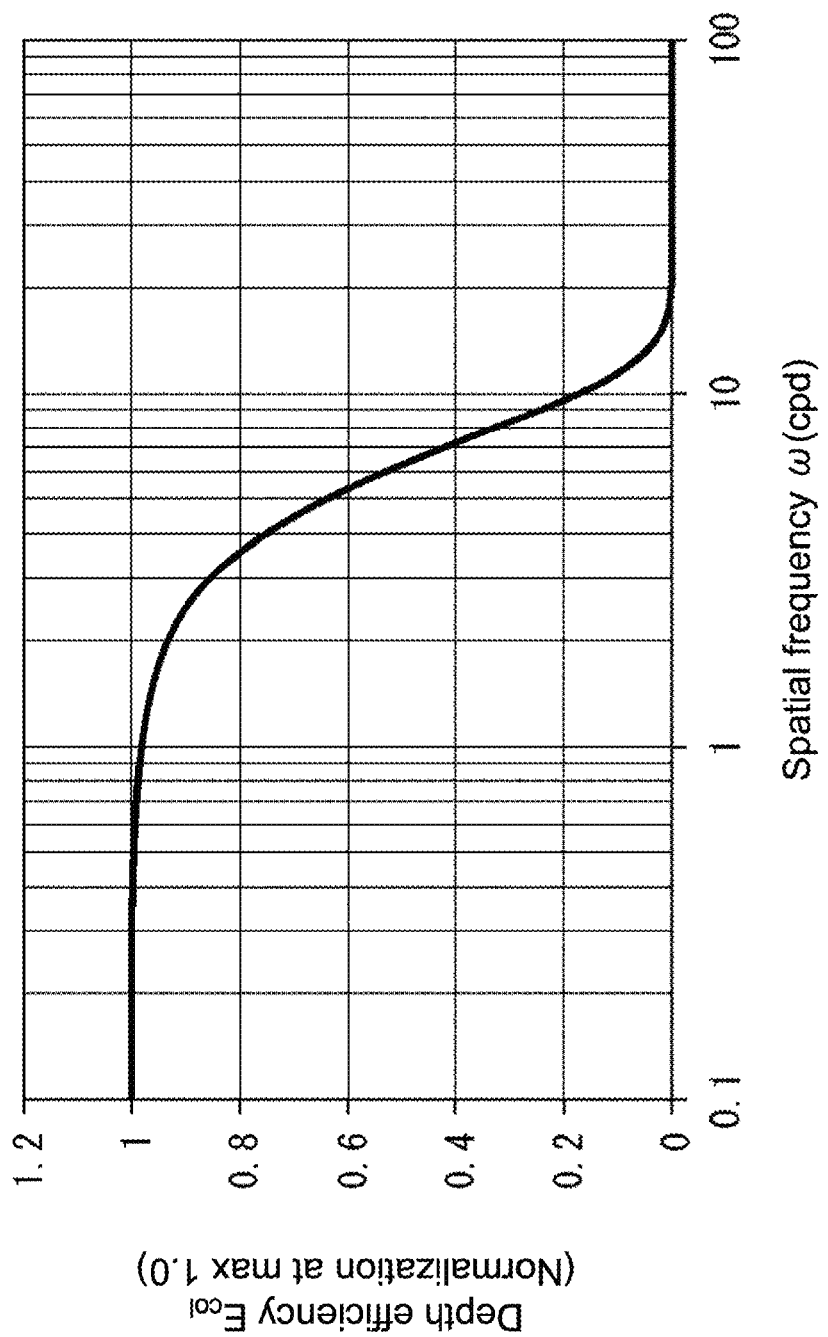
FIG. 3 is a diagram showing depth efficiency $E_{col}(\omega)$ with color saturation.

FIG. 3 is a graph of the depth efficiency $E_{col}(\omega)$ with the color saturation in Equation 4.

As shown in FIG. 3, the lower the spatial frequency $\omega$, the higher the depth efficiency $E_{col}(\omega)$ with color saturation becomes, and the higher the spatial frequency $\omega$, the lower the depth efficiency $E_{col}(\omega)$ with color saturation becomes, i.e., like a visual filter with low-pass characteristics. However, Equation 4 is different from Equation 3 for the depth efficiency $E_{lum}(\omega)$ with the luminance contrast.

In this embodiment, the depth efficiency $E_{lum}(\omega)$ with luminance contrast and the depth efficiency $E_{col}(\omega)$ with color saturation are represented by the exponential functions as above, but any other functions may be used for the representation.

As Equation 5 below, polynomial approximation may be used for the representation by domain segmentation into three, for example. Alternatively, piecewise linear approximation is also a possibility.

[Math. 5]

$$E = \begin{cases} 1 & (x < a) \\ \sum_{k=0}^{k=n} a_n x^n & (a \leq x \leq b) \\ 0 & (b < x) \end{cases} \tag{5}$$

Using the retina's response $I_{lum}$ to luminance contrast defined as above, a subjective depth amount $D_{lum}$ to be perceived only with luminance contrast is represented by Equation 6 below.
[Math. 6]

$$D_{lum} = A_{lum} \log_{10} I_{lum} \tag{6}$$

Moreover, using the retina's response $I_{col}$ to color saturation, a subjective depth amount $D_{col}$ to be perceived only with color saturation is represented by Equation 7 below.
[Math. 7]

$$D_{col} = A_{col} \log_{10} I_{col} \tag{7}$$

A subjective depth amount $D(I_{lum}, I_{col})$ to be perceived by a combination of the subjective depth amount $D_{lum}$ with luminance contrast and the subjective depth amount $D_{col}$ with color saturation is represented by Equation 8 below.

[Math. 8]

$$D(I_{lum}, I_{col}) = \begin{cases} D_{lum} + B, & D_{col} < D_{lum} \\ D_{col} + B, & D_{col} \geq D_{lum} \end{cases} \tag{8}$$

In Equations 6, 7, and 8, $A_{lum}$, $A_{col}$, and B are each a given constant. Equation 8 shows that when the subjective depth amount $D_{lum}$ with luminance contrast is larger than the subjective depth amount $D_{col}$ with color saturation, the subjective depth amount $D(I_{lum}, I_{col})$ is perceived more by the subjective depth amount $D_{lum}$ with luminance contrast. On the other hand, when the subjective depth amount $D_{col}$ with color saturation is larger than the subjective depth amount $D_{lum}$ with luminance contrast, Equation 8 shows that the subjective depth amount $D(I_{lum}, I_{col})$ is perceived more by the subjective depth amount $D_{col}$ with color saturation.

In Equations 6 and 7, function approximation is realized with high accuracy by data fitting with a logarithmic function, i.e., the data obtained by visual tests. Alternatively, the subjective depth amounts $D_{lum}$ and $D_{col}$ may be each represented also by Naka-Rushton equation utilized as to visual response.

Exemplified above is the analysis in the spatial frequency domain by Fourier transform to describe how to calculate the retina's response $I_{lum}$ to luminance contrast and the retina's response $I_{col}$ to color saturation. Alternatively, to approximately calculate the retina's response $I_{lum}$ to luminance contrast and the retina's response $I_{col}$ to color saturation, wavelet transform may be performed on a luminance-component image and a color-saturation-component image, or a band-pass filter such as Gabor filter may be used thereon.

An image processing apparatus that will be described below adjusts the perceived depth amount in an image using the quantitative relationship of FIG. 1 as an evaluation function, i.e., the quantitative relationship obtained by visual tests between the luminance contrast/color saturation of the image and the depth perception.

[Block Diagram of Image Processing Apparatus]

Figure 4:
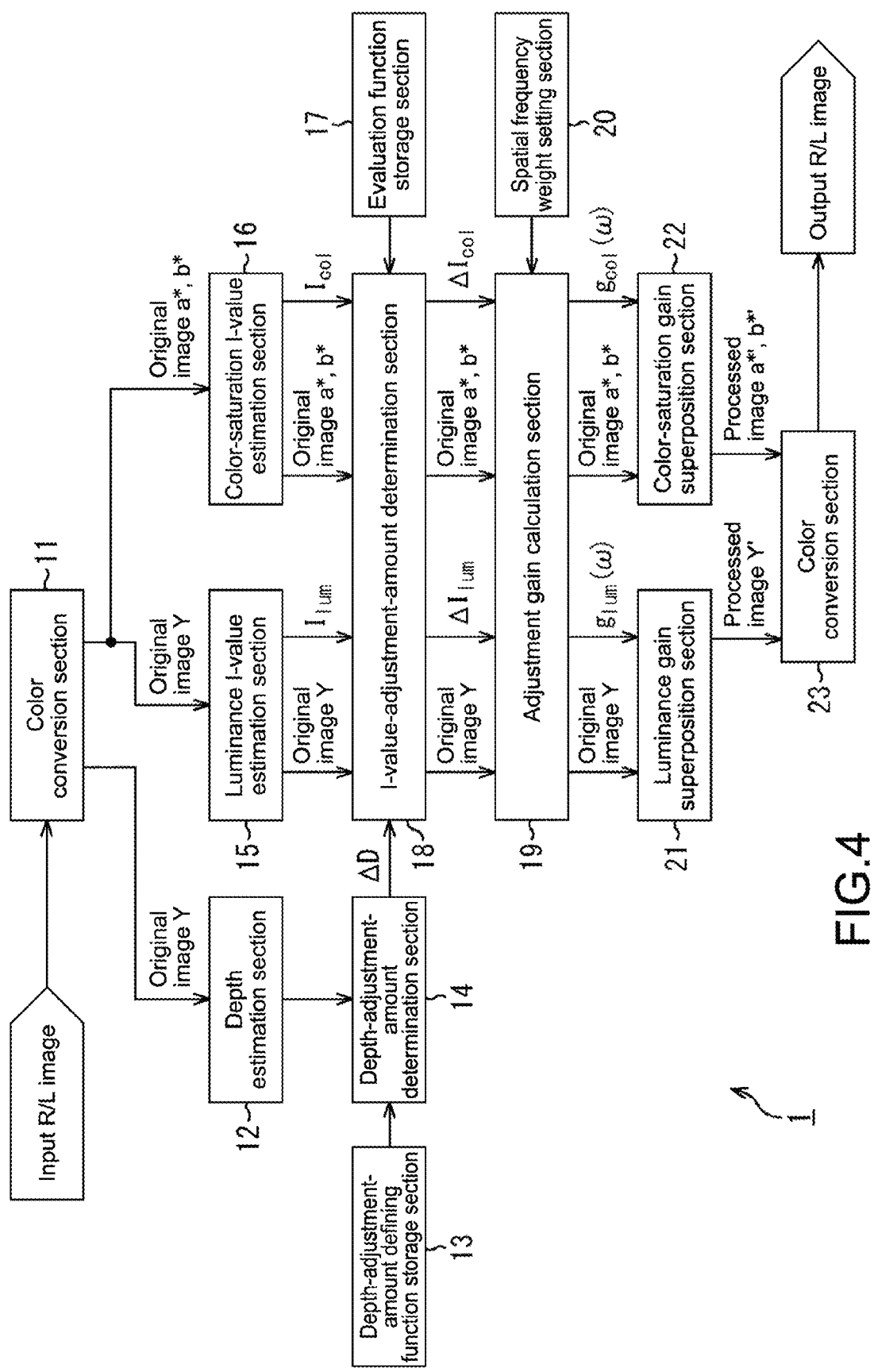
FIG. 4 is a block diagram showing an exemplary configuration of an image processing apparatus in a first embodiment with the application of the present disclosure.

FIG. 4 is a block diagram showing an exemplary configuration of an image processing apparatus in a first embodiment with the application of the present disclosure.

An image processing apparatus 1 controls the luminance contrast and the color saturation of an input 3D image to adjust the depth perception therewith. The 3D image herein means an image to let a viewer perceive that the image is 3D.

A 3D image (hereinafter, referred also to as original image) input to the image processing apparatus 1 is supplied to a color conversion section 11. The 3D image from the outside is in various data formats, and the data format is not restrictive, e.g., a first data format for a stereo image including a right-eye image (R image) and a left-eye image (L image), a second data format for a multi-view image including three or more images viewed from three or more positions, and a third data format being a combination of a 2D image with depth information thereabout. Assumed in this embodiment is that the data of an incoming 3D image is in the first data format, and the image processing apparatus 1 processes both right- and left-eye images.

The color conversion section 11 decomposes the provided original image, i.e., the right- and left-eye images, into luminance and color-saturation components, e.g., the color system of the original image is converted into CIE L*a*b* to obtain a luminance component of L* ($\propto$ luminance component Y) and color-saturation components of a* and b*. To be specific, when the original image is the RGB color image, color conversion therefor is calculated by Equations 9 to 14 below that are defined by CIE.

[Math. 9]

$$X=0.4125R+0.35760+0.1804B \quad (9)$$

$$Y=0.2126R+0.71520+0.0722B \quad (10)$$

$$Z=0.0193R+0.11920+0.9502B \quad (11)$$

$$L^*=116(Y/Y_n)^{1/3}-16 \quad (12)$$

$$a^*=500((X/X_n)^{1/3}-(Y/Y_n)^{1/3}) \quad (13)$$

$$b^*=200((Y/Y_n)^{1/3}-(Z/Z_n)^{1/3}) \quad (14)$$

The color conversion section 11 supplies the luminance component Y of the original image (original image Y) obtained by Equation 10 to both a depth estimation section 12 and a luminance I-value estimation section 15. The color conversion section 11 also supplies the color-saturation components a* and b* of the original image (original images a* and b*) respectively obtained by Equations 13 and 14 to a color-saturation I-value estimation section 16. Herein, instead of the luminance component Y, the luminance component for use may be L* obtained by Equation 12.

The depth estimation section 12 estimates depth information (disparity) about each pixel in the original image provided by the color conversion section 11. To be specific, the depth estimation section 12 calculates displacement of pixels being points horizontally corresponding to each other in a pair of stereo images, i.e., calculates so-called binocular parallax. Using the resulting binocular parallax as a basis, the depth estimation section 12 approximately calculates the depth information. The binocular parallax may be calculated by block matching or by the gradient method of estimating a displacement amount between points corresponding to each other utilizing correlation, i.e., spatial correlation in terms of in-plane luminance gradient, and correlation between R and L images.

When the 3D image is input in the second data format, the depth estimation section 12 uses any two corresponding images among three or more others in a multi-view image to calculate binocular parallax therebetween, and using the resulting binocular parallax, approximately calculates the depth information. When the 3D image is input in the third data format, the depth estimation section 12 uses the depth information included in the image.

The depth information estimated by the depth estimation section 12 is supplied to a depth-adjustment-amount determination section 14.

A depth-adjustment-amount defining function storage section 13 stores a depth-adjustment-amount defining function for supply to the depth-adjustment-amount determination section 14. The depth-adjustment-amount defining function defines a depth adjustment amount with respect to (the value of) the depth information.

[Exemplary Depth-Adjustment-Amount Defining Function]

Figure 5:
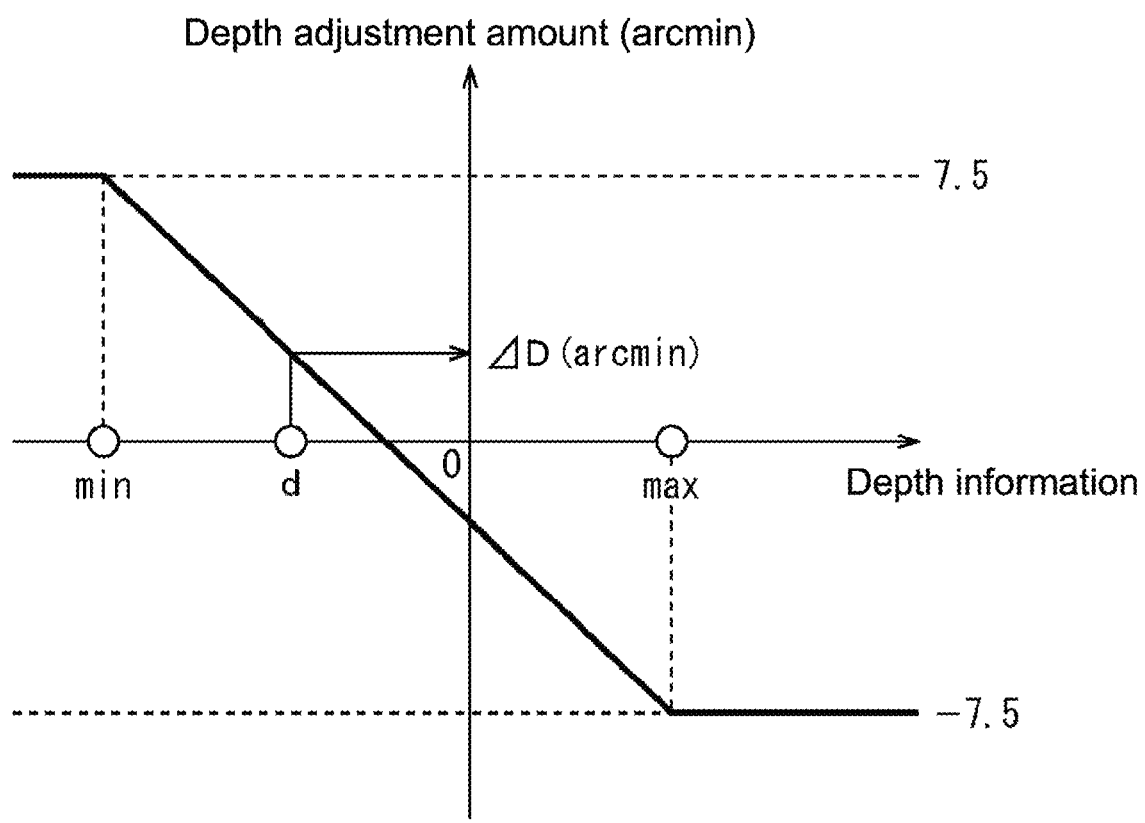
FIG. 5 is a diagram showing an exemplary function of defining a depth adjustment amount.

FIG. 5 shows an exemplary depth-adjustment-amount defining function to be stored in the depth-adjustment-amount defining function storage section 13.

The lateral axis of FIG. 5 indicates depth information (unit: pixel) to be detected in an input 3D image, and the vertical axis indicates a depth adjustment amount (unit: arcmin). The depth information is a disparity with which a user perceives an object image as being toward the back when the disparity is positive, and the user perceives the object as being toward the front when the disparity is negative. The depth adjustment amount is a value with which the object image is adjusted to be toward the front when the value is positive, and the object image is adjusted to be toward the back when the value is negative.

With the depth-adjustment-amount defining function of FIG. 5, the dynamic range of an image is increased in terms of 3D form and depth, i.e., in an input 3D image, any object at the back is moved to be more toward the back, and any object in the front is moved to be more toward the front.

Based on such a depth-adjustment-amount defining function stored in the depth-adjustment-amount defining function storage section 13, the depth-adjustment-amount determination section 14 of FIG. 4 determines a depth adjustment amount for each pixel in an original image. As an example, using the depth-adjustment-amount defining function of FIG. 5, the depth-adjustment-amount determination section 14 determines a depth adjustment amount $\Delta D$ for each pixel in an original image, i.e., depth information d, for example.

The resulting depth adjustment amount Δ is supplied to an I-value-adjustment-amount determination section 18.

The luminance-I-value estimation section 15 analyzes a local area (M×N pixels) around a target pixel to calculate a luminance-contrast model input value $I_{lum}$ for the target pixel using Equations 1 and 2 described above. The target pixel herein is each pixel in the original image. The luminance I-value estimation section 15 supplies the resulting luminance-contrast model input value $I_{lum}$ to the I-value-adjustment-amount determination section 18 together with the luminance component Y of each pixel in the original image.

The color-saturation I-value estimation section 16 analyzes a local area (M×N pixels) around a target pixel to calculate a color-saturation model input value $I_{col}$ for the target pixel using Equations 3 and 4 described above. The target pixel herein is each pixel in the original image.

The color-saturation I-value estimation section 16 supplies the resulting color-saturation model input value $I_{col}$ to the I-value-adjustment-amount determination section 18 together with the color-saturation components a* and b* of each pixel in the original image.

An evaluation function storage section 17 stores the evaluation function of FIG. 1. That is, the evaluation function storage section 17 stores the evaluation function of quantizing the relationship obtained by visual tests between the luminance contrast/color saturation of an image and the depth perception.

Based on the evaluation function stored in the evaluation function storage section 17, the I-value-adjustment-amount determination section 18 determines an adjustment amount ΔI for a model input value I corresponding to the depth adjustment amount ΔD determined by the depth-adjustment-amount determination section 14. That is, the I-value-adjustment-amount determination section 18 determines an adjustment amount $\Delta I_{lum}$ for the luminance-contrast model input value $I_{lum}$, and an adjustment amount $\Delta I_{col}$ for the color-saturation model input value $I_{col}$.

To be specific, with the luminance-contrast model input value $I_{lum}$ and the color-saturation model input value $I_{col}$ on the evaluation function, i.e., at a 2D model input vector $I=(I_{lum}, I_{col})$ thereon, a subjective depth amount $D_0$ is known first. This subjective depth amount $D_0$ is perceived with luminance contrast and color saturation in the original image. The I-value-adjustment-amount determination section 18 searches the evaluation function space to find a point at which the depth adjustment amount takes a value of ΔD as that provided by the depth-adjustment-amount determination section 14.

Figure 6:
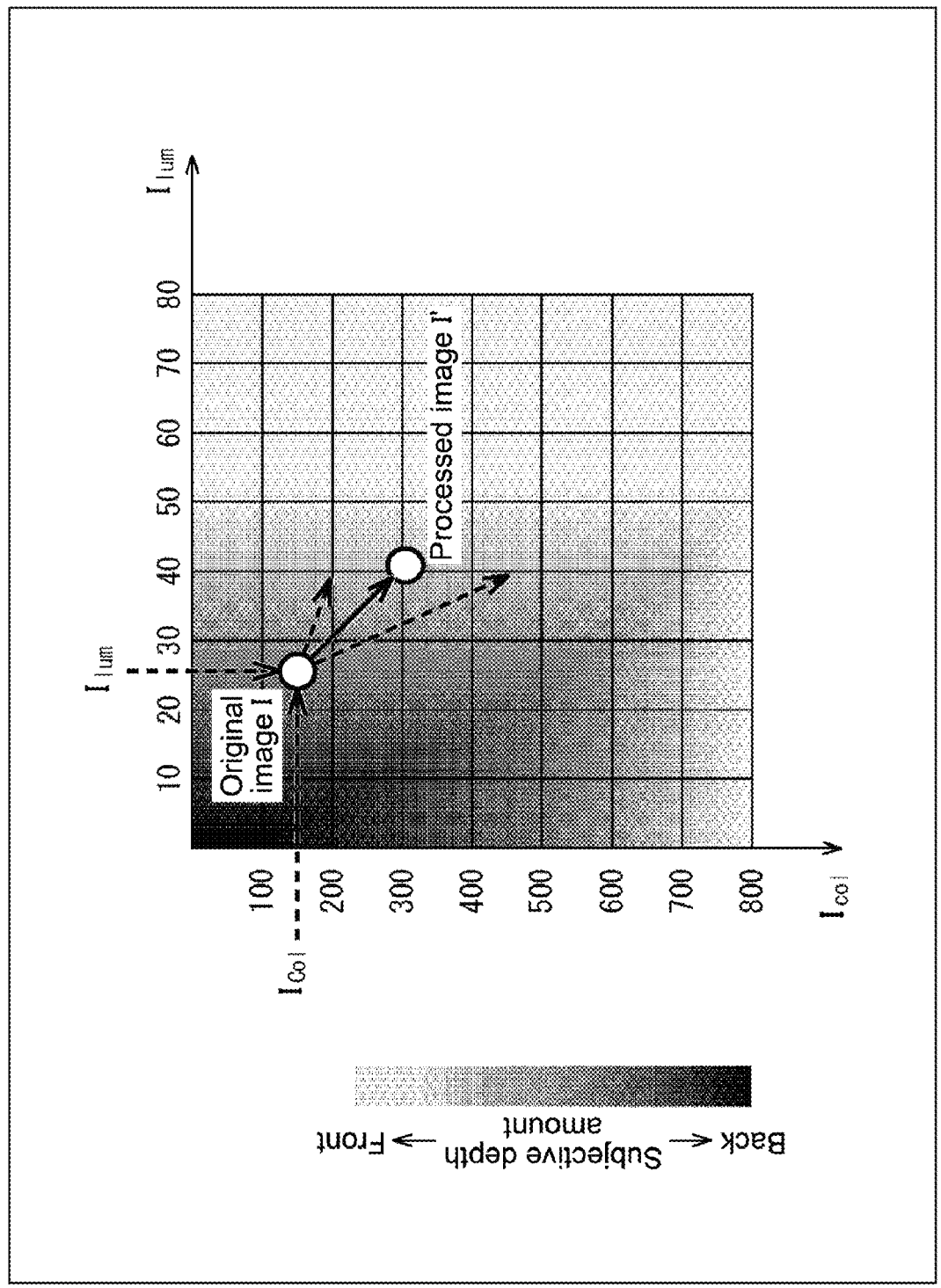
FIG. 6 is a diagram illustrating a lookup of a point on an evaluation function.

In other words, as shown in FIG. 6, in the evaluation function space, the I-value-adjustment-amount determination section 18 looks up the evaluation function starting from the model input vector I of the original image to find a point at which the subjective depth amount is $D_0+\Delta D$. At this time, the lookup direction from the starting point for the I-value-adjustment-amount determination section 18 is defined by an adjustment vector n.

The adjustment vector n is a user-setting parameter to set the adjustment balance between the luminance contrast and the color saturation based on the lookup direction, and is defined by Equation 15 below.

[Math. 10]

$$n = (a \times I_{lum}, b \times I_{col}) \quad (15)$$

In Equation 15, a and b are respectively parameters to adjust the balance between a luminance-contrast adjustment gain and a color-saturation adjustment gain. The numerical relation (ratio) between these parameters a and b is used as a basis to adjust the balance of gain between the luminance-contrast adjustment gain and the color-saturation adjustment gain. As an example, when the parameters a and b are so set as to satisfy a>b, the luminance-contrast adjustment gain is adjusted to be larger than the color-saturation adjustment gain. On the other hand, when the parameters a and b are so set as to satisfy a<b, the luminance-contrast adjustment gain is adjusted to be smaller than the color-saturation adjustment gain. When the parameters a and b are so set as to satisfy a=b, the luminance-contrast adjustment gain is adjusted to be equal to the color-saturation adjustment gain.

When the adjustment vector n is defined as in Equation 15, a model input value $I'=(I'_{lum}, I'_{col})$ is represented as below. The model input value is a value obtained by the luminance contrast and the color saturation in the original image done with a depth control process (hereinafter, referred to as "processed image").

[Math. 11]

$$I' = I + \varepsilon \times n \quad (16)$$
$$\Leftrightarrow (I'_{lum}, I'_{col}) = (I_{lum}, I_{col}) + \varepsilon \times (a \times I_{lum}, b \times I_{col})$$
$$\Leftrightarrow (I'_{lum}, I'_{col}) = ((1 + \varepsilon \times a) \times I_{lum}, (1 + \varepsilon \times b) \times I_{col})$$
$$\therefore I'_{lum} = (1 + \varepsilon \times a) \times I_{lum},$$
$$I'_{col} = (1 + \varepsilon \times b) \times I_{col}$$

Equation 16 shows that defining the adjustment vector n by Equation 15 obtains a ratio of $(1+\varepsilon \times a):(1+\varepsilon \times b)$ between the luminance-contrast adjustment gain and the color-saturation adjustment gain. This tells that the parameters a and b are able to adjust the balance between the luminance-contrast adjustment gain and the color-saturation adjustment gain. In Equation 16, ε denotes a normalization coefficient to obtain the depth adjustment amount of ΔD.

In the evaluation function space, the I-value-adjustment-amount determination section 18 looks up the evaluation function in the direction of the adjustment vector n starting from the model input vector I of the original image. This obtains the model input vector of $I'=(I'_{lum}, I'_{col})$ with which the subjective depth amount is $D_0+\Delta D$.

After the model input vector of $I'=(I'_{lum}, I'_{col})$ with which the subjective depth amount is $D_0+\Delta D$ is obtained, Equations 17 and 18 respectively obtain an adjustment amount $\Delta I_{lum}$ for the luminance-contrast model input value $I_{lum}$, and an adjustment amount $\Delta I_{col}$ for the color-saturation model input value $I_{col}$.

[Math. 12]

$$\Delta I_{lum} = I'_{lum} - I_{lum} \quad (17)$$

$$\Delta I_{col} = I'_{col} - I_{col} \quad (18)$$

The calculation result, i.e., the adjustment amount $\Delta I_{lum}$ for the luminance-contrast model input value $I_{lum}$ and the adjustment amount $\Delta I_{col}$ for the color-saturation model input value $I_{col}$, is supplied to an adjustment gain calculation section 19 together with the luminance component Y and the color-saturation components a* and b* of the original image.

Using Equations 19 and 20 below, the adjustment gain calculation section 19 calculates both a luminance-contrast adjustment gain $g_{lum}(\omega)$ and a color-saturation adjustment gain $g_{col}(\omega)$

[Math. 13]

$$g_{lum}(\omega) = 1 + f_{lum}(\omega) \cdot |\Delta I_{lum}| / |\int_{\omega \in \Omega} E_{lum}(\omega) S_{lum}(\omega) f_{lum}(\omega) d\omega| \quad (19)$$

$$g_{col}(\omega) = 1 + f_{col}(\omega) \cdot |\Delta I_{col}| / |\int_{\omega \in \Omega} E_{col}(\omega) S_{col}(\omega) f_{col}(\omega) d\omega| \quad (20)$$

In Equations 19 and 20, $f_{lum}(\omega)$ denotes a weighting function for the luminance-contrast adjustment gain at the spatial frequency $\omega$ (hereinafter, referred to as luminance-contrast weighting function), and $f_{col}(\omega)$ denotes a weighting function for the color-saturation adjustment gain at the spatial frequency $\omega$ (hereinafter, referred to as color-saturation weighting function). When the value is positive, it means that a process to be performed is for enhancement, when the value is negative, it means that a process to be performed is for reduction, and when the value is 0, it means that no process is to be performed.

In Equations 19 and 20, the luminance-contrast weighting function $f_{lum}(\omega)$ and the color-saturation weighting function $f_{col}(\omega)$ are each a user-setting parameter, and are provided by a spatial frequency weight setting section 20. The user may set the parameters, i.e., the luminance-contrast weighting function $f_{lum}(\omega)$ and the color-saturation weighting function $f_{col}(\omega)$, considering only the weight of an adjustment gain for each spatial frequency. With such parameter setting, the adjustment amount for the luminance contrast and that for the color saturation are respectively normalized to be $\Delta I_{lum}$ and $\Delta I_{col}$ by Equations 19 and 20.

The spatial frequency weight setting section 20 stores both the luminance-contrast weighting function $f_{lum}(\omega)$ and the color-saturation weighting function $f_{col}(\omega)$, which are set by the user's operation. The spatial frequency weight setting section 20 supplies the luminance-contrast weighting function $f_{lum}(\omega)$ and the color-saturation weighting function $f_{col}(\omega)$ to the adjustment gain calculation section 19. The luminance-contrast weighting function $f_{lum}(\omega)$ and the color-saturation weighting function $f_{col}(\omega)$ stored in the spatial frequency weight setting section 20 vary in characteristics, e.g., enhance the low-frequency side, enhance the high-frequency side, or enhance the entire frequency range. When no specific distinction is expected between the luminance-contrast weighting function $f_{lum}(\omega)$ and the color-saturation weighting function $f_{col}(\omega)$, these weighting functions are simply referred to as "weighting function $f(\omega)$". Also as to the adjustment amounts $\Delta I_{lum}$ and $\Delta I_{col}$, when no specific distinction is expected therebetween, these adjustment amounts are simply referred to as "adjustment amount $\Delta I$".

[Setting Example of Weighting Function $f(\omega)$]

Figure 7:
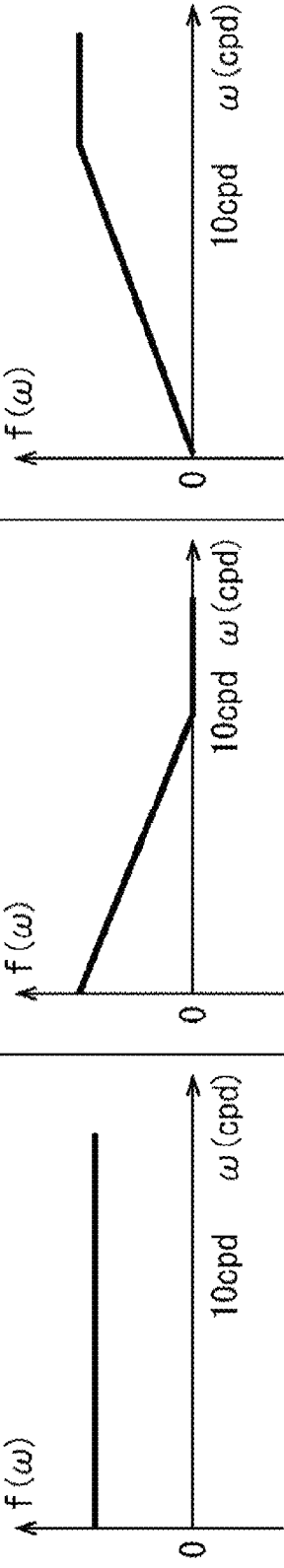
FIG. 7 is a diagram showing setting examples of a weighting function $f(\omega)$.
Figure 8:
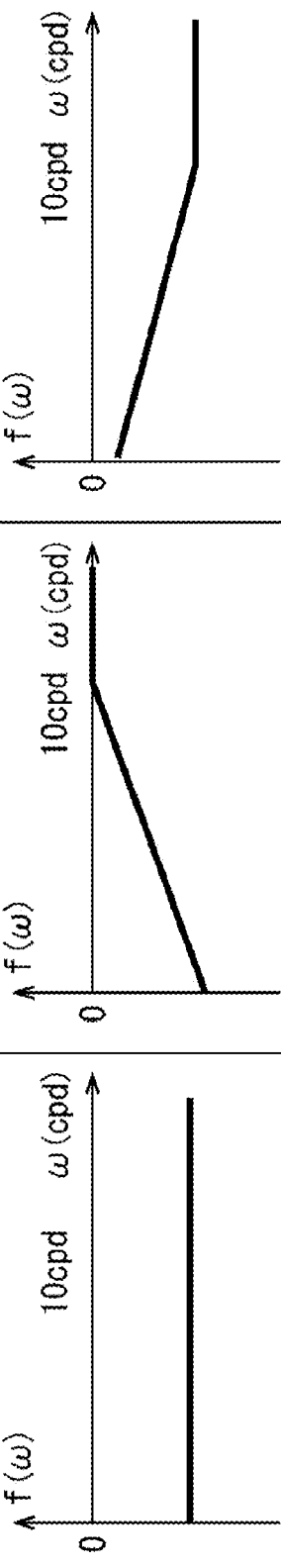
FIG. 8 is a diagram showing other setting examples of the weighting function $f(\omega)$.
Figure 9:
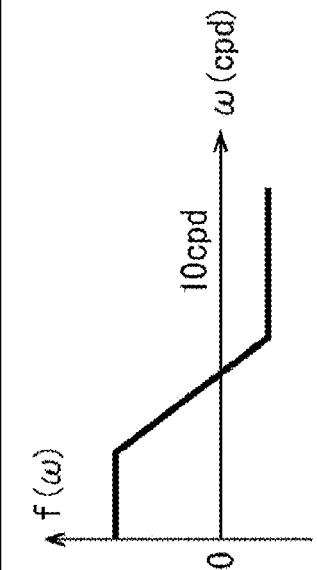
FIG. 9 is a diagram showing still other setting examples of the weighting function $f(\omega)$.

FIGS. 7 to 9 each show a setting example of the weighting function $f(\omega)$ to be stored in the spatial frequency weight setting section 20.

FIG. 7 shows a setting example of the weighting function $f(\omega)$ when an object image is adjusted to be more toward the front, i.e., when the depth adjustment amount $\Delta D$ and the adjustment amount $\Delta I$ for the model input value I are both positive ($\Delta D > 0 \Leftrightarrow \Delta I > 0$).

FIG. 7 shows three setting examples of the weighting function $f(\omega)$, i.e., A shows a setting example for uniform enhancement of the entire spatial frequency range to be n-times higher, B shows a setting example for enhancement of the low spatial frequency range, and C shows a setting example for enhancement of the high spatial frequency range.

With the uniform enhancement of the entire spatial frequency range to be n-times higher as A in FIG. 7, the Michelson contrast is also enhanced to be n-times higher. The Michelson contrast is defined by Equation 21 below.

[Math. 14]

$$\text{Michelson contrast} = \frac{L_{max} - L_{min}}{L_{max} + L_{min}} \quad (21)$$

In Equation 21, $L_{max}$ denotes the largest luminance value in a processing unit area of the original image, and $L_{min}$ denotes the smallest luminance value in the processing unit area of the original image. The processing unit area is optimally defined in size as appropriate considering the relationship between the visual angle and the number of pixels.

With the enhancement of the low spatial frequency range as B in FIG. 7, the original image is subjected to shadow enhancement to preserve edges, and thus the resulting image may look less crisp.

With the enhancement of the high spatial frequency range as C in FIG. 7, the original image is subjected to edge enhancement to preserve shadows, and thus noise may be enhanced in a monotonous image area in which the luminance of pixels is of the same level.

FIG. 8 shows a setting example of the weighting function $f(\omega)$ when an object image is adjusted to be more toward the back, i.e., when the depth adjustment amount $\Delta D$ and the adjustment amount $\Delta I$ for the model input value I are both negative ($\Delta D < 0 \Leftrightarrow \Delta I < 0$).

FIG. 8 shows three setting examples of the weighting function $f(\omega)$, i.e., A shows a setting example for reduction of the entire spatial frequency range to be n-times lower, B shows a setting example for reduction of the low spatial frequency range, and C shows a setting example for reduction of the high spatial frequency range.

With the reduction of the entire spatial frequency range to be n-times lower as A in FIG. 8, the Michelson contrast is reduced to be n-times lower.

With the reduction of the low spatial frequency range as B in FIG. 8, the original image is subjected to edge preservation to reduce shadows. When the resulting image is with too much high-frequency components, this may cause the impression that the texture looks different.

With the reduction of the high spatial frequency range as C in FIG. 8, the original image is subjected to shadow preservation to reduce edges, and thus the resulting image may give an impression as being blurred compared with the image after reduction of the entire spatial frequency range as A in FIG. 8.

With the weighting functions $f(\omega)$ of FIGS. 7 and 8, the domain of the function is positive or negative at all times. Alternatively, as long as the weighting function $f(\omega)$ satisfies any predetermined constraint conditions, the domain of the weighting function $f(\omega)$ is not expected to be positive or negative at all times.

FIG. 9 shows other setting examples of the weighting function $f(\omega)$ when an object image is adjusted to be more toward the front.

For adjusting an object image to be more toward the front, the weighting function $f(\omega)$ may also be so set as shown in FIG. 9 as long as the weighting function $f(\omega)$ satisfies constraint conditions of Equation 22 below.

[Math. 15]

$$\int (E(\omega) S(\omega) f(\omega)) d\omega > 0 \quad (22)$$

FIG. 9 shows setting examples of the weighting function $f(\omega)$, i.e., A shows a setting example for enhancement of the low spatial frequency band but reduction of the high spatial frequency band, and B shows a setting example for enhancement mainly of any specific spatial frequency range.

With the enhancement of the low spatial frequency band but reduction of the high spatial frequency band as A in FIG. 9, the original image is subjected to edge enhancement to reduce shadows.

The process of B in FIG. 9, i.e., the enhancement mainly of any specific spatial frequency band, is performed when a spatial frequency band is selected for adjusting an image object in accordance with the characteristic amount thereof.

For adjusting an object image to be more toward the back, the weighting function f(ω) may also be so set as shown in FIG. 9 as long as the weighting function f(ω) satisfies constraint conditions of Equation 23 below. That is, although not shown, the weighting function f(ω) may be so set as to reduce the low spatial frequency band but to enhance the high spatial frequency band, or to mainly reduce any specific spatial frequency band.

[Math. 16]

$$\int (E(\omega)S(\omega)f(\omega))d\omega < 0 \qquad (23)$$

As described above, using the parameters, the adjustment gain calculation section 19 is able to determine gains varying with spatial frequency ω to adjust the luminance contrast and the color saturation. The luminance-contrast adjustment gain $g_{lum}(\omega)$ calculated by Equation 19 is supplied to a luminance gain superimposition section 21 together with the original image Y, and the color-saturation adjustment gain $g_{col}(\omega)$ calculated by Equation 20 is supplied to a color-saturation gain superimposition section 22 together with the color-saturation components a* and b*.

The luminance gain superimposition section 21 calculates a processed image Y' by superimposing, on the original image Y, the luminance-contrast adjustment gain glum(ω) provided by the adjustment gain calculation section 19. The resulting processed image Y' is supplied to a color conversion section 23.

To be specific, first of all, the luminance gain superimposition section 21 converts the original image Y into a spatial frequency domain by Fourier transform. Fourier transform on the original image Y is represented by Equation 24 below.

[Math. 17]

$$f(u, v) = \frac{1}{2\pi} \int_{-\infty}^{\infty} \int_{-\infty}^{\infty} f(x, y)\exp(-j2\pi(ux + vy))dxdy \qquad (24)$$

Next, by Equation 25, the luminance gain superimposition section 21 superimposes, on a Fourier coefficient f(u, v), the luminance-contrast adjustment gain $g_{lum}(\omega)$ calculated by the adjustment gain calculation section 19. Equation 25 uniquely defines ω by the values of u and v so that g(u, v)=g(ω) is satisfied.

[Math. 18]

$$f'(u,v) = f(u,v) \cdot g(u,v) \qquad (25)$$

In other words, the luminance gain superimposition section 21 performs convolution integral between the luminance-contrast adjustment gain $g_{lum}(\omega)$ and a luminance contrast $S_{lum}(\omega)$, which is obtained as a spectrum of each spatial frequency domain after conversion by Fourier transform.

Lastly, the luminance gain superimposition section 21 performs inverse Fourier transform of Equation 26 to convert, back into the image domain, the spectra obtained by superimposition of the luminance-contrast adjustment gain $g_{lum}(\omega)$. This obtains the processed image Y'.

[Math. 19]

$$f'(u, v) = \frac{1}{2\pi} \int_{-\infty}^{\infty} \int_{-\infty}^{\infty} f'(u, v)\exp(-j2\pi(ux + vy))dudv \qquad (26)$$

The luminance gain superimposition section 21 supplies the luminance component Y' of the processed image, i.e., processed image Y', obtained by the process as above to the color conversion section 23.

Using the color-saturation adjustment gain $g_{col}(\omega)$ calculated by the adjustment gain calculation section 19, the color-saturation gain superimposition section 22 calculates color-saturation components a*' and b*' of the processed mage (processed images a*' and b*') in the manner similar to the luminance gain superimposition section 21. The calculation result is supplied to the color conversion section 23.

The color conversion section 23 performs conversion inversely to the conversion performed by the color conversion section 11. That is, the color conversion section 23 converts the processed image represented by the CIE L*a*b* color system to be represented by the RGB color system. The processed image is thus converted back to be in the color system same as the original image, and then is output.

[Flowchart of Depth Control Process]

By referring to a flowchart of FIG. 10, described next is a depth control process to be performed by the image processing apparatus 1 for depth adjustment through control over the luminance contrast and the color saturation of an original image. This process is started when the image processing apparatus 1 is provided with an original image from the outside, for example.

First of all, in step S1, the color conversion section 11 performs color conversion to convert the color system of the original image from RGB to CIE L*a*b*. This decomposes each of a right-eye image (R image) and a left-eye image (L image) into luminance and color-saturation components, for example.

In step S2, the depth estimation section 12 estimates depth information (disparity) for each pixel in the original image provided by the color conversion section 11.

In step S3, using the depth-adjustment-amount defining function stored in the depth-adjustment-amount defining function storage section 13, the depth-adjustment-amount determination section 14 determines a depth adjustment amount ΔD based on the estimated depth information.

Ion step S4, using Equations 1 and 2 described above, the luminance I-value estimation section 15 calculates a luminance-contrast model input value $I_{lum}$ of the original image.

In step S5, using Equations 3 and 4 described above, the color-saturation I-value estimation section 16 calculates a color-saturation model input value $I_{col}$ of the original image.

The processes in steps S4 and S5 may be performed in the reverse order or at the same time.

In step S6, based on the evaluation function stored in the evaluation function storage section 17, the I-value-adjustment-amount determination section 18 determines an adjustment amount ΔI for the model input value I corresponding to the depth adjustment amount ΔD determined by the process in step S3. That is, the I-value-adjustment-amount determination section 18 determines an adjustment amount $\Delta I_{lum}$ for the luminance-contrast model input value $I_{lum}$, and an adjustment amount $\Delta I_{col}$ for the color-saturation adjustment amount $I_{col}$.

In step S7, by Equations 19 and 20, the adjustment gain calculation section 19 calculates both a luminance-contrast adjustment gain $g_{lum}(\omega)$ and a color-saturation adjustment gain $g_{col}(\omega)$.

In step S8, the luminance gain superimposition section 21 superimposes, on the original image Y, the luminance-contrast adjustment gain $g_{lum}(\omega)$ obtained by the process in step S7, thereby calculating the luminance component Y of the processed image.

That is, in step S8, the luminance component Y of the original image is converted into a spatial frequency domain by Fourier transform. Thereafter, convolution integral is performed between the luminance-contrast adjustment gain $g_{lum}(\omega)$ and the luminance contrast $S_{lum}(\omega)$ obtained as a spectrum, and the result of convolution integral is converted back into the image domain, thereby calculating the luminance component Y' of the processed image.

In step S9, the color-saturation gain superimposition section 22 superimposes the color-saturation adjustment gain $g_{col}(\omega)$ obtained by the process in step S7, thereby calculating color-saturation components a*' and b*' of the processed image.

That is, the color-saturation components a* and b* of the original image is converted into a spatial frequency domain by Fourier transform. Thereafter, convolution integral is performed between the color-saturation adjustment gain $g_{col}(\omega)$ and the color saturation $S_{col}(\omega)$ obtained as a spectrum, and the result of convolution integral is converted back into the image domain, thereby calculating the color-saturation components a*' and b*' of the processed image.

The processes in steps S8 and S9 may be performed in the reverse order or at the same time.

In step S10, the color conversion section 23 performs color conversion to convert the processed image represented by the CIE L*a*b* color system to be represented again by the RGB color system. The color-converted processed image is then output from the image processing apparatus 1, and this is the end of the process.

[Image Processing Example]

Figure 11A:
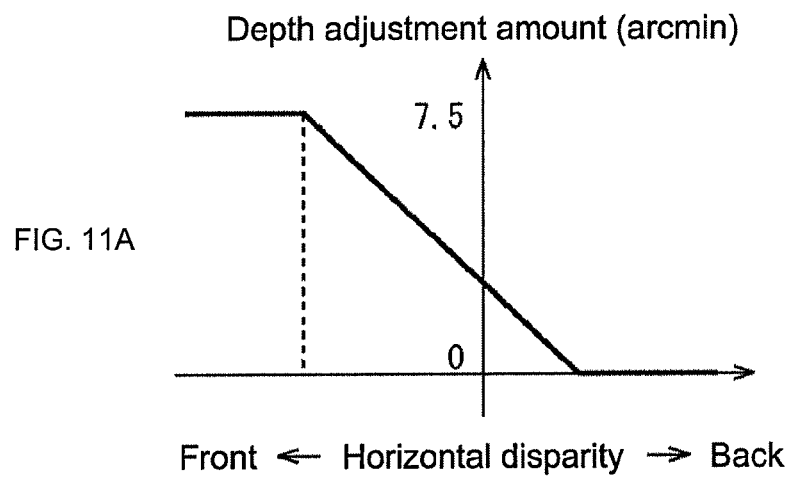
FIGS. 11A to 11C are each a diagram illustrating an exemplary result of image processing.
Figure 12:
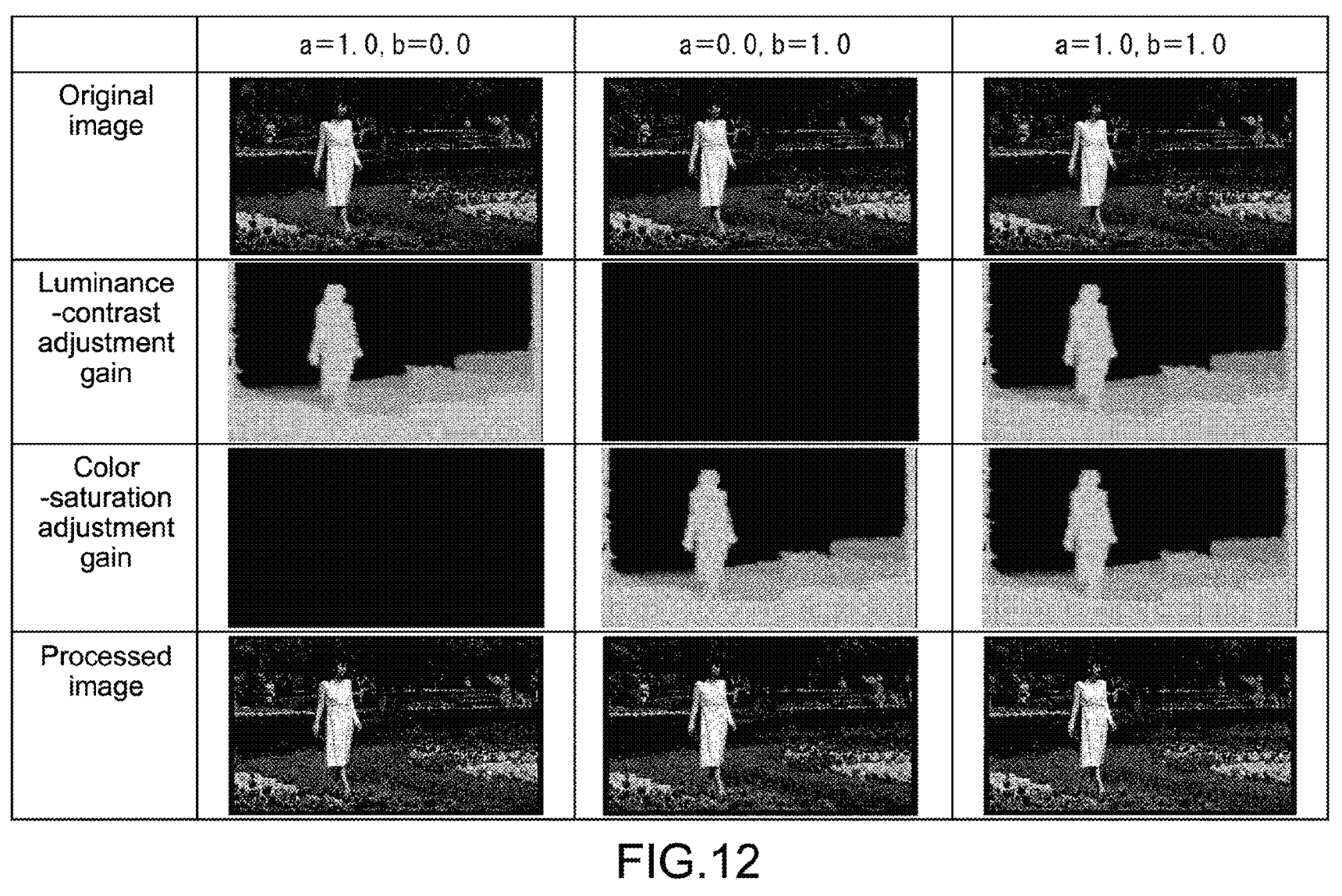

By referring to FIGS. 11A to 12, described are the results of image processing examples.

Figure 11B:
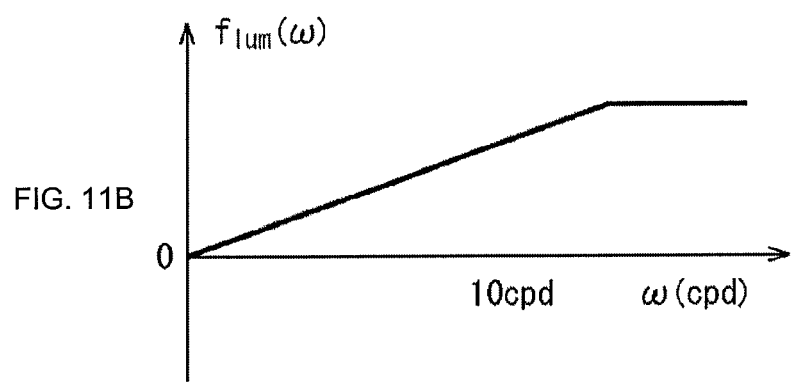
Figure 11C:
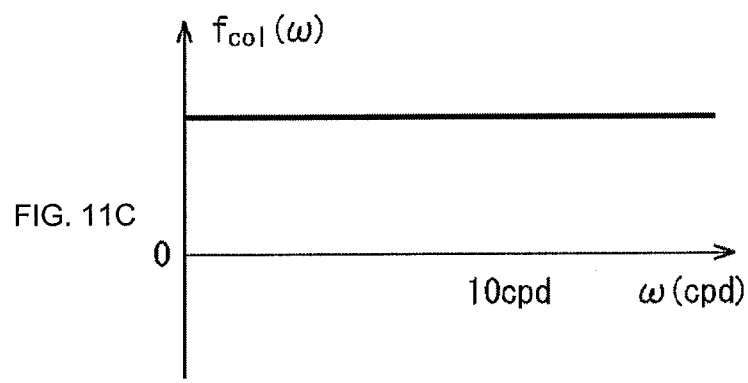

FIGS. 11A to 11C each show a parameter used to obtain the image processing results of FIG. 12.

FIG. 11A shows a depth-adjustment-amount defining function, which is the used parameter.

In an image processing example of FIG. 12, used is the depth-adjustment-amount function with which the depth adjustment amount ΔD is set to be in a range from 0.0 to 7.5 (arcmin) depending on the depth information. The depth information in use is a horizontal disparity, which is obtained by calculating a displacement amount between corresponding points in a right-eye image (R image) and a left-eye image (L image).

To be more specific, with the depth-adjustment-amount defining function of FIG. 11A, the forefront area is adjusted by the amount of +7.5 (arcmin), the rear area is not adjusted, and the remaining area is linearly adjusted in depth, thereby increasing the dynamic range of the image in terms of the subjective depth amount D.

In this example, although the area is adjusted linearly by the depth adjustment amount, the depth-adjustment-amount defining function may be piecewise linear or nonlinear.

FIG. 11B shows a luminance-contrast weighting function $f_{lum}(\omega)$, which is the used parameter.

In an image processing example of FIG. 12, used is the luminance-contrast weighting function $f_{lum}(\omega)$ with which the high-frequency range is mainly enhanced as shown in FIG. 11B. This improves the sharpness of luminance components in the image so that the definition is accordingly improved at the same time with depth control.

FIG. 11C shows a color-saturation weighting function $f_{col}(\omega)$, which is the used parameter.

In the image processing example of FIG. 12, as shown in FIG. 11C, used is the color-saturation weighting function $f_{col}(\omega)$ with which the entire spatial frequency range (including DC components) is enhanced with a uniform weight. This enhances the color-saturation components in the image so that the sharpness is accordingly improved at the same time with depth control.

FIG. 12 shows the results of image processing when the depth control process is performed under the respective conditions of FIGS. 11A to 11C using three types of parameters a and b, i.e., (a, b)=(1.0, 0.0), (0.0, 1.0), and (1.0, 1.0). These parameters are for determining the adjustment balance between the luminance contrast and the color saturation.

Quantitatively, (a, b)=(1.0, 0.0) means to adjust only the luminance contrast, (a, b)=(0.0, 1.0) means to adjust only the color saturation, and (a, b)=(1.0, 1.0) means to adjust both the luminance contrast and the color saturation with good balance.

In FIG. 12, the values of gains, i.e., the luminance-contrast adjustment gain $g_{lum}(\omega)$ and the color-saturation adjustment gain $g_{col}(\omega)$, are visualized by image representation with which a gray-scale value is increased with a larger gain value.

FIG. 12 shows that an original image is processed using the parameters a and b to change the adjustment balance between the luminance contrast and the color saturation. Especially when (a, b)=(1.0, 1.0), the color-saturation components in the image are adjusted in addition to the luminance components therein so that the image sharpness is adjusted at the same time with adjustment of the contrast, edge, shading, and others.

As described above, the depth control process by the image processing apparatus 1 determines the adjustment amount $\Delta I_{lum}$ for the luminance-contrast model input value $I_{lum}$, and the adjustment amount $\Delta_{col}$ for the color-saturation model input value $I_{col}$, which are those corresponding to the depth adjustment amount ΔD determined based on the depth-adjustment-amount defining function for each pixel in an input image. The luminance-contrast adjustment gain $g_{lum}(\omega)$ and the color-saturation adjustment gain $g_{col}(\omega)$ are then determined so as to respectively satisfy the adjustment amounts $\Delta I_{lum}$ and $\Delta I_{col}$. The adjustment amount ΔI for the model input value I corresponding to the depth adjustment amount ΔD is determined based on the evaluation function, which indicates the quantitative relationship obtained by visual tests between the luminance contrast and the color saturation of the image and the depth perception.

Therefore, by adjusting both the luminance contrast and the color saturation being parameters for monocular stereo information based on the human visual performance, control is executed over the image in terms of depth and 3D form to be perceived therein, thereby being able to produce the effect of depth control without degrading the image quality. This eliminates having to control the parallax to control the 3D form and the depth so that the user may not feel something is wrong or not feel much discomfort with the resulting 3D image. The present disclosure offers very realistic visual experience for the user with a high-definition and wide-color-range display.

Also with the depth control process, the adjustment vector n determines the lookup direction on the evaluation function space so that the luminance-contrast adjustment gain and the color-saturation adjustment gain are adjusted with desired balance.

Moreover, by the user selecting any desired function stored in the spatial frequency weight setting section 20, i.e., the luminance-contrast weighting function $f_{lum}(\omega)$ or the color-saturation weighting function $f_{col}(\omega)$, the image may be characterized as the user prefers, e.g., the low-frequency side is enhanced, the high-frequency side is enhanced, the entire spatial frequency range is enhanced.

[Other Examples for Spatial Frequency Conversion]

In the embodiment above, described is the example of adjusting the luminance contrast and the color saturation by calculating the luminance-contrast adjustment gain $g_{lum}(\omega)$ and the color-saturation adjustment gain $g_{col}(\omega)$ using Fourier transform. Alternatively, approximately adjusting the luminance contrast and the color saturation may be also possible by wavelet transform on a luminance-component image and a saturation-component image, or by using a band-pass filter such as Gabor filter thereon.

Described now is an example of adjusting the luminance contrast of an original image by a process other than Fourier transform.

As a first example, for uniformly enhancing the entire spatial frequency range to be g-times higher, the following process is used.

First of all, in a rectangular area around $(x, y) = (s, t)$, an average value $Y_{ave}(s, t)$ of luminance is calculated, where $(x, y)$ being the position of an original image is represented as below.

$$s-dx<x<s+dx, t-dy<y<t+dy$$

The average value $Y_{ave}(s, t)$ of luminance may be calculated by simple addition averaging or Gaussian mean. Next, by calculating the contrast-adjusted luminance value $Y'(s, t)$ using a mapping function of Equation below, the g-times contrast-adjusted luminance value $Y'(s, t)$ is obtained.

$$Y'(s,t) = G(s,t)(Y(s,t) - Y_{ave}(s,t)) + Y_{ave}(s,t)$$

With this mapping function, any DC component is subtracted from the original image, only an AC component is multiplied by g, and the DC component is added again.

Figure 13:
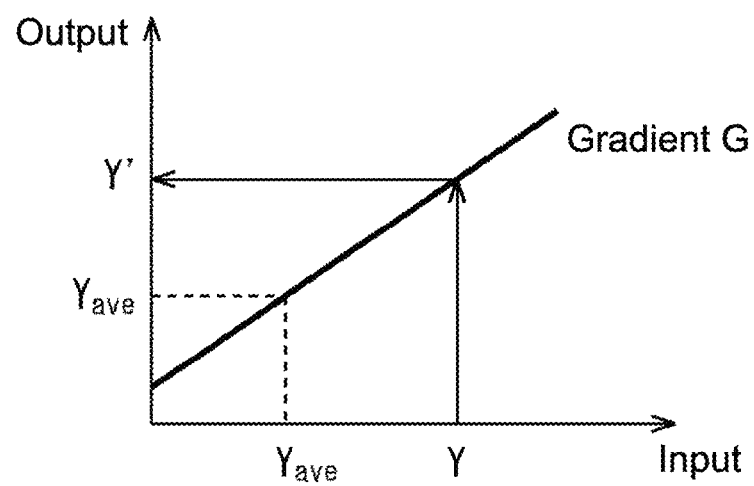
FIG. 13 is a diagram illustrating an exemplary processing other than Fourier transform.

FIG. 13 is a conceptual diagram of the above-mentioned image processing example.

As a second example, described next is an example of enhancing the high spatial frequency range.

First of all, in a rectangular area around $(x, y) = (s, t)$, the spatial frequency distribution is subjected to quick and easy analysis using a plurality of band-pass linear filters, e.g., LOG filters or Gabor filters, where $(x, y)$ being the position of an original image is represented as below.

$$s-dx<x<s+dx, t-dy<y<t+dy$$

Thereafter, using an image sharpening filter $K(x, y)$, the contrast-adjusted luminance value $Y'(s, t)$ is calculated by Equation 27 so that the luminance value $Y'(s, t)$ is obtained with the enhanced high spatial frequency range.

[Math. 20]

$$Y'(s, t) = \sum_{s-dx<x<s+dx} \sum_{t-dy<y<t+dy} K(x-s, y-t)Y(x, y) \quad (27)$$

Figure 14:
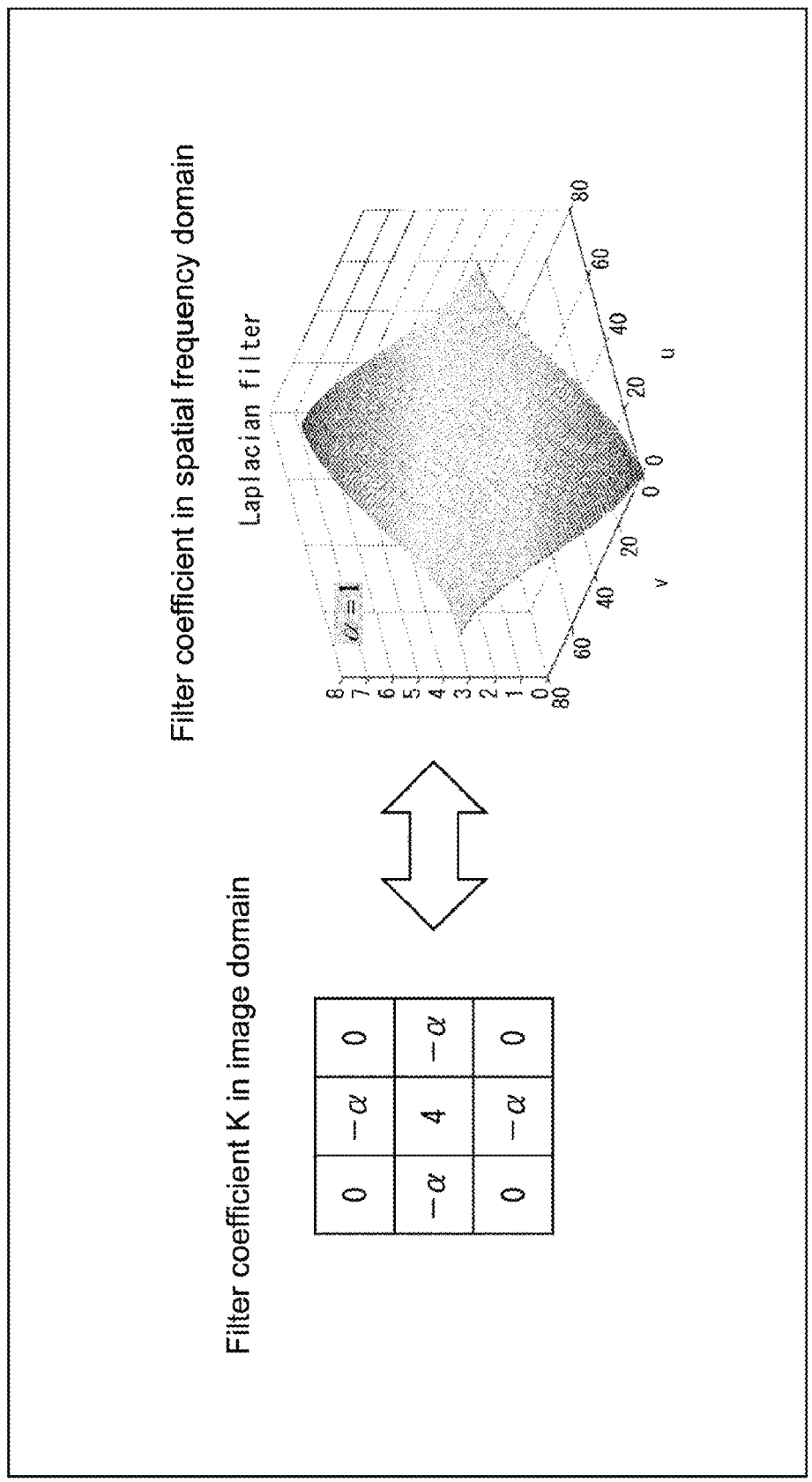
FIG. 14 is a diagram illustrating another exemplary processing other than Fourier transform.

FIG. 14 shows the spatial frequency characteristics of the image sharpening filter $K(x, y)$.

The high spatial frequency range may be enhanced not by Fourier transform but by using an image sharpening filter, i.e., a desired gain multiple of $\alpha$ in a spatial frequency domain is stored as a table, and the image sharping filter is used for adaptive filtering based on the analysis result of the spatial frequency distribution in the rectangular area. The shape of the image sharpening filter $K(x, y)$ is not restricted to this example.

[Other Examples for Evaluation Function]

In the embodiment above, described is the example that Equation 8 represents the evaluation function of the subjective depth amount $D(I_{lum}, I_{col})$, which is perceived in combination of the luminance-contrast subjective depth amount $D_{lum}$, and the color-saturation subjective depth amount $D_{col}$. The evaluation function is not restricted thereto.

Equation 28 below shows another example for the evaluation function of the subjective depth amount $D(I_{lum}, I_{col})$.

[Math. 21]

$$D(I_{lum}, I_{col}) = ((A_{lum} \log_{10} I_{lum})^n + (A_{col} \log_{10} I_{col})^n)^{1/n} + B \quad (28)$$

In Equation 28, $A_{lum}$, $A_{col}$, and B are each a given constant. The evaluation function of Equation 28 is the model represented by the sum of the luminance-contrast subjective depth amount $D_{lum}$ to the n-th power, and the color-saturation subjective depth amount $D_{col}$ to the n-th power.

Figure 15:
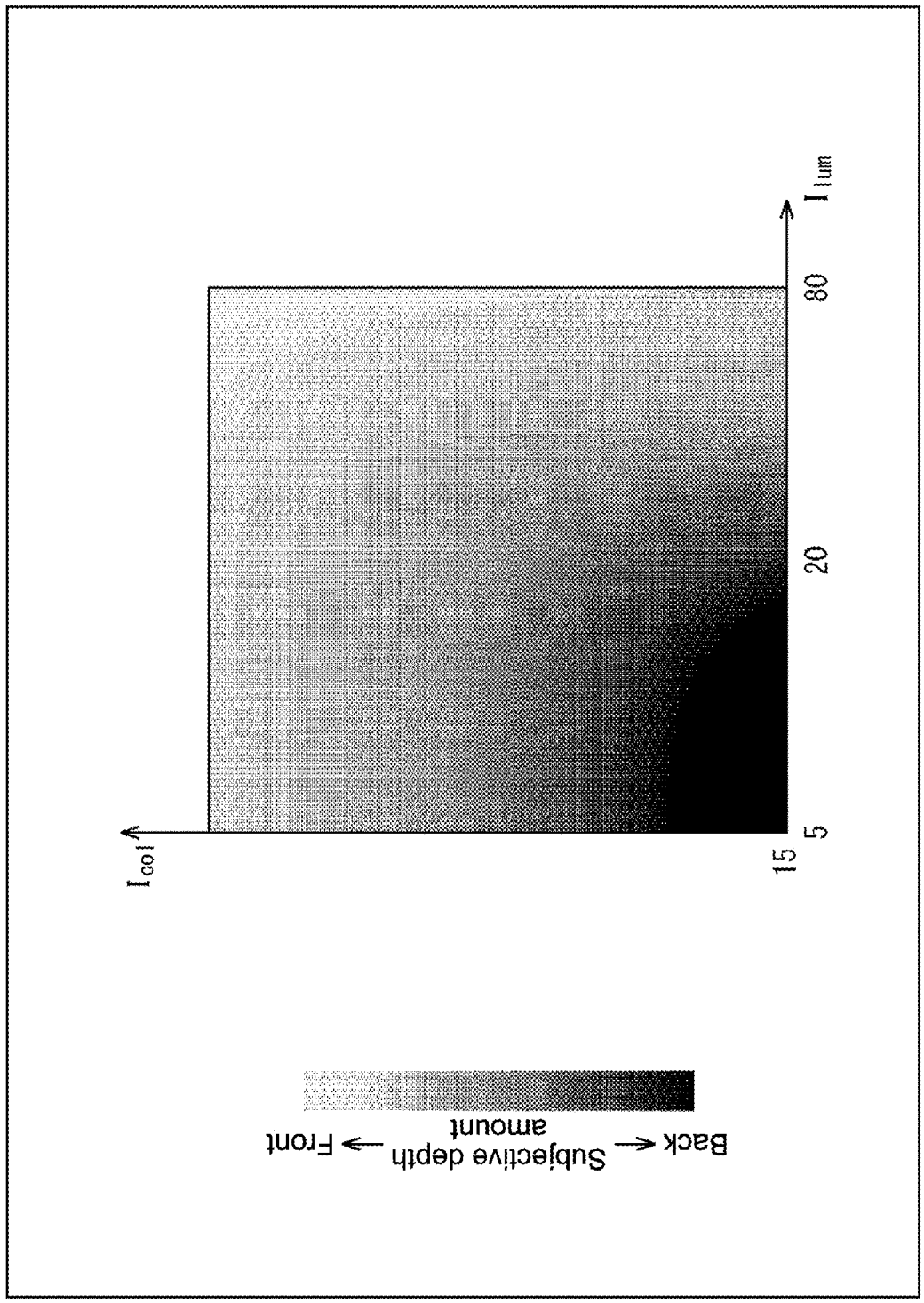
FIG. 15 is a diagram illustrating another exemplary evaluation function.

FIG. 15 is a mapping diagram of the evaluation function represented by the model of Equation 28, i.e., the sum of the amounts to the n-th power. Similarly to FIG. 1, FIG. 15 shows that an object is perceived as being more toward the front when the luminance contrast or the color saturation is high, but the contour lines form a shape rounder than those with Equation 8.

[2. Second Embodiment]

[Block Diagram of Image Processing Apparatus]

Figure 16:
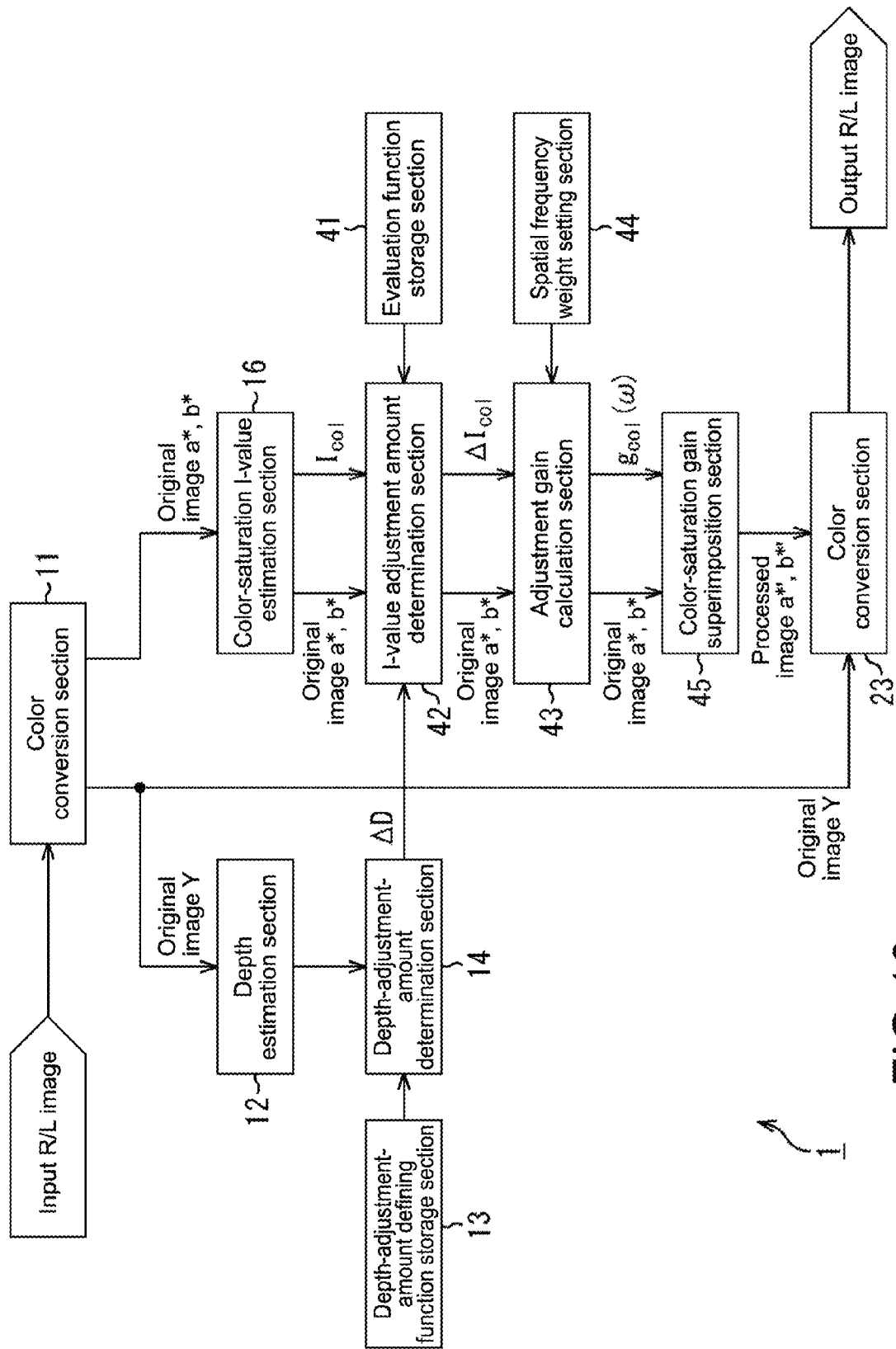
FIG. 16 is a block diagram showing an exemplary configuration of an image processing apparatus in a second embodiment with the application of the present disclosure.

FIG. 16 is a block diagram showing an exemplary configuration of an image processing apparatus in a second embodiment with the application of the present disclosure.

In the first embodiment described above, described is the example of adjusting the depth by controlling the luminance contrast and the color saturation of an image. In the second embodiment, described is an example of adjusting the depth by controlling only the color saturation of an image with no change of the luminance contrast thereof.

In FIG. 16, any component corresponding to that in the first embodiment of FIG. 4 is provided with the same reference numeral, and is not described again.

In the second embodiment, the components not provided are the luminance I-value estimation section 15 and the luminance gain superimposition section 21. As alternatives to the components, i.e., the evaluation function storage section 17, the I-value adjustment amount determination section 18, the adjustment gain calculation section 19, the spatial frequency weight setting section 20, and the color-saturation gain superimposition section 22, other components are provided, i.e., an evaluation function storage section 41, an I-value-adjustment-amount determination section 42, an adjustment gain calculation section 43, a spatial frequency weight setting section 44, and a color-saturation gain superimposition section 45.

The evaluation function storage section 41 stores an evaluation function of quantizing the relationship obtained by visual tests between the color saturation of an image and the depth perception.

Figure 17:
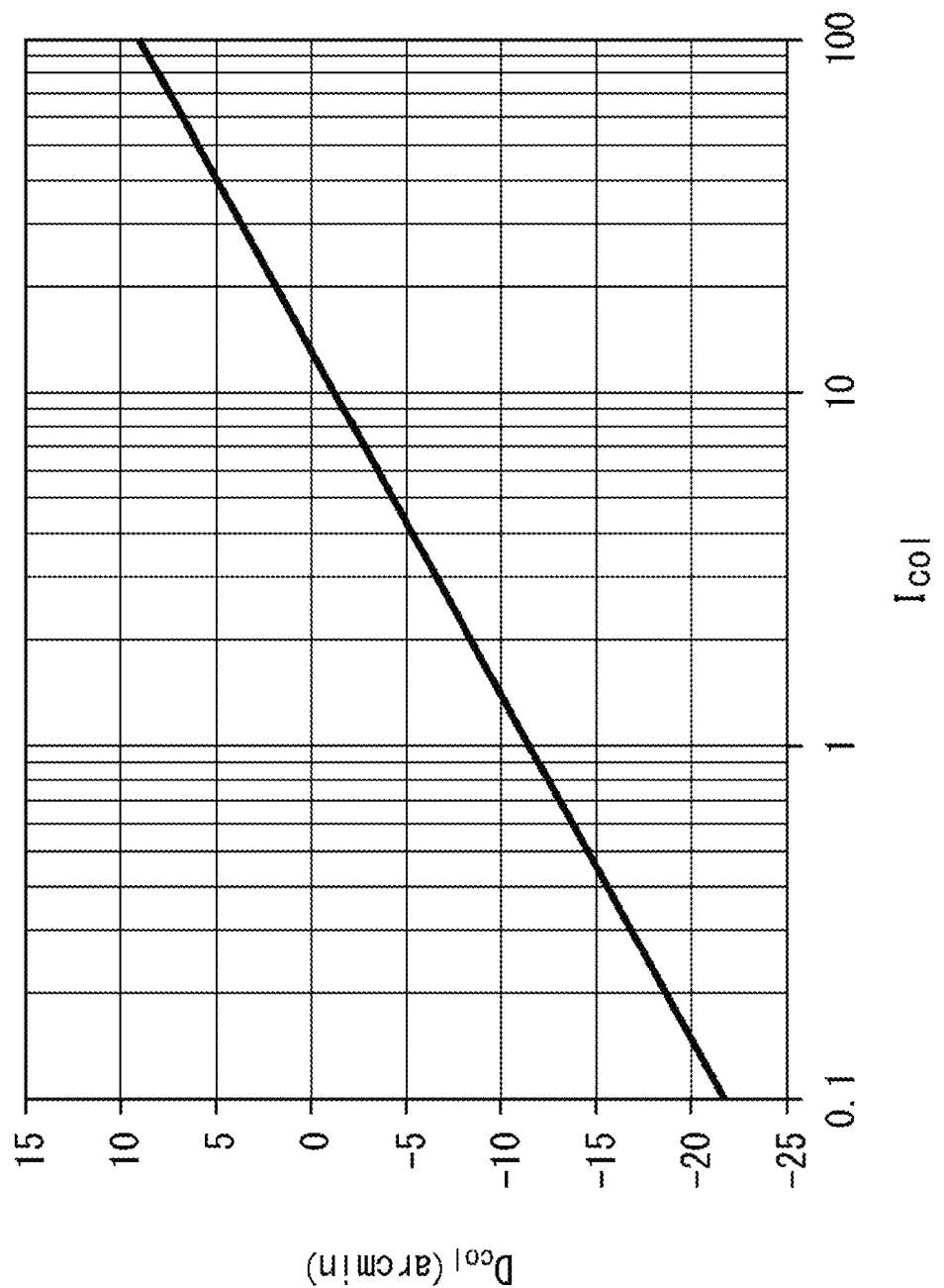
FIG. 17 is a diagram illustrating an exemplary evaluation function in the second embodiment.

FIG. 17 shows an exemplary evaluation function to be stored in the evaluation function storage section 41.

The evaluation function of FIG. 17 is represented by Equation 29 below.

[Math. 22]

$$D_{col} = A_{col} \log_{10} I_{col} + B_{col} \tag{29}$$

In Equation 29, $A_{col}$ and $B_{col}$ are each a given constant, and in FIG. 17, $A_{col}$ is 10.3, and $B_{col}$ is −11.5.

Figure 18:
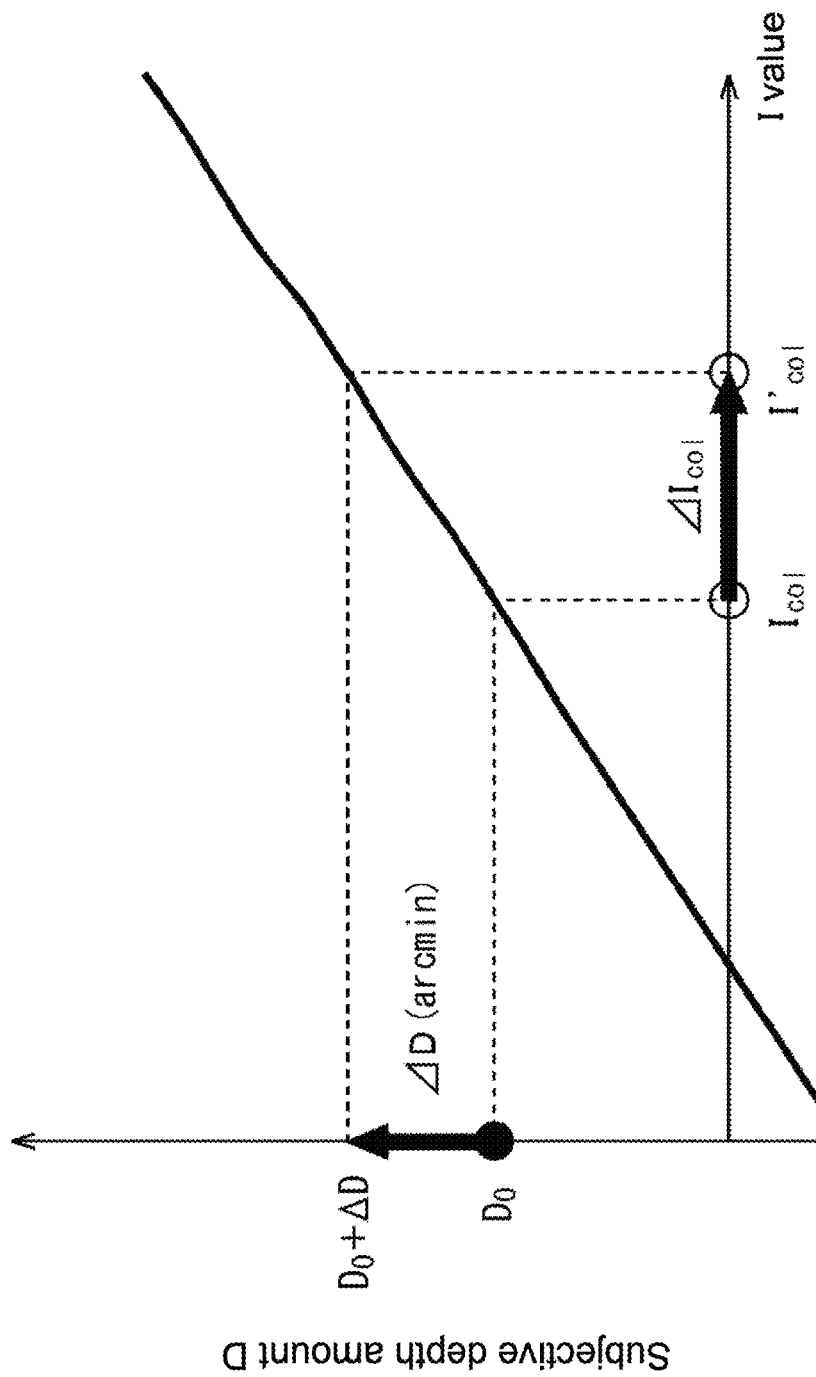
FIG. 18 is a diagram illustrating a process to be performed by an I-value-adjustment-amount determination section.

As shown in FIG. 18, starting from a color-saturation model input value $I_{col}$ of an original image, the I-value-adjustment-amount determination section 42 looks up the evaluation function to find a model input value $I'_{col}$ at which a subjective depth amount is $D_0+\Delta D$.

After the model input vector of $I'_{col}$ with which the subjective depth amount is $D_0+\Delta D$ is obtained, an adjustment amount $\Delta I_{col}$ for the color-saturation model input value $I_{col}$ is obtained by Equation 18.

The adjustment gain calculation section 43 calculates a color-saturation adjustment gain $g_{col}(\omega)$ by Equation 20 described above.

The spatial frequency weight setting section 44 stores various color-saturation weighting functions $f_{col}(\omega)$, which are set by the user's operation. That is, unlike the spatial frequency weight setting section 20 in the first embodiment, the spatial frequency weight setting section 44 does not store the luminance-contrast weight function $f_{lum}(\omega)$.

Using the color-saturation adjustment gain $g_{col}(\omega)$ calculated by the adjustment gain calculation section 43, the color-saturation gain superimposition section 45 calculates color-saturation components a*' and b*' of the processed image (processed images a*' and b*'). The calculation result is supplied to the color conversion section 23.

Figure 19:
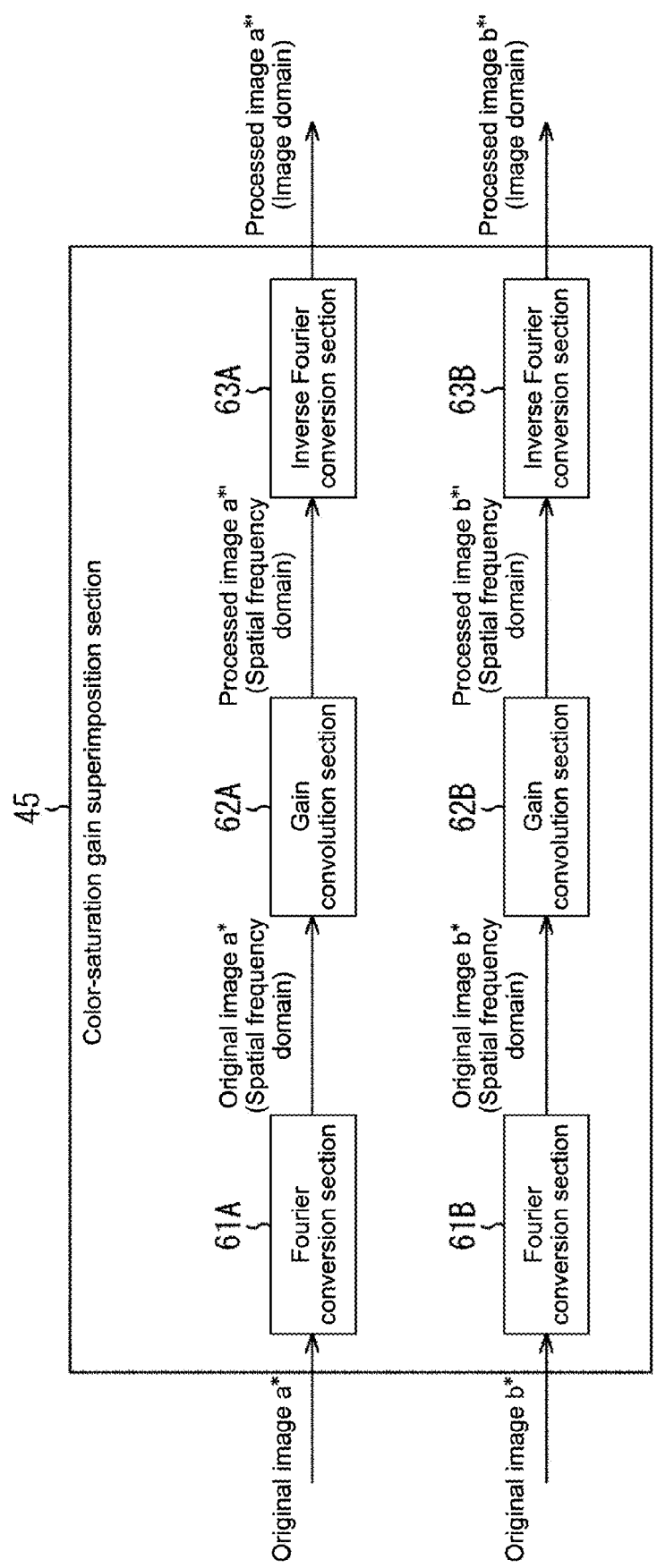
FIG. 19 is a block diagram showing a detailed exemplary configuration of a color-saturation gain superimposition section.

FIG. 19 is a block diagram showing an exemplary detailed configuration of the color-saturation gain superimposition section 45.

The color-saturation gain superimposition section 45 includes Fourier transform sections 61A and 61B, gain convolution sections 62A and 62B, and inverse Fourier transform sections 63A and 63B.

The components, i.e., the Fourier transform section 61A, the gain convolution section 62A, and the inverse Fourier transform section 63A, perform a process of superimposing the color-saturation adjustment gain $g_{col}(\omega)$ on the color-saturation component a* of the original image. On the other hand, the components, i.e., the Fourier transform section 61B, the gain convolution section 62B, and the inverse Fourier transform section 63B, perform a process of superimposing the color-saturation adjustment gain $g_{col}(\omega)$ on the color saturation b* of the original image.

The Fourier transform section 61A converts the color-saturation component a* of the original image into a spatial frequency domain by Fourier transform of Equation 24 described above.

By Equation 25, the gain convolution section 62A superimposes, on a Fourier coefficient f(u, v), the color-saturation adjustment gain $g_{col}(\omega)$ calculated by the adjustment gain calculation section 43. This obtains color-saturation component a*' of the processed image adjusted in gain in the spatial frequency domain.

The inverse Fourier transform section 63A performs inverse Fourier transform of Equation 26 described above to convert, back into the image domain, the spectrum obtained by superimposition of the color-saturation adjustment gain $g_{col}(\omega)$. This obtains the color-saturation component a*' of the processed image on the image domain.

The processes performed by the components, i.e., the Fourier transform section 61B, the gain convolution section 62B, and the inverse Fourier transform section 63B, are similar to those performed by the components, i.e., the Fourier transform section 61A, the gain convolution section 62A, and the inverse Fourier transform section 63A except that the operation target is not the color-saturation component a* of the original image but the color-saturation component b* thereof. The processes are thus not described again.

Figure 10:
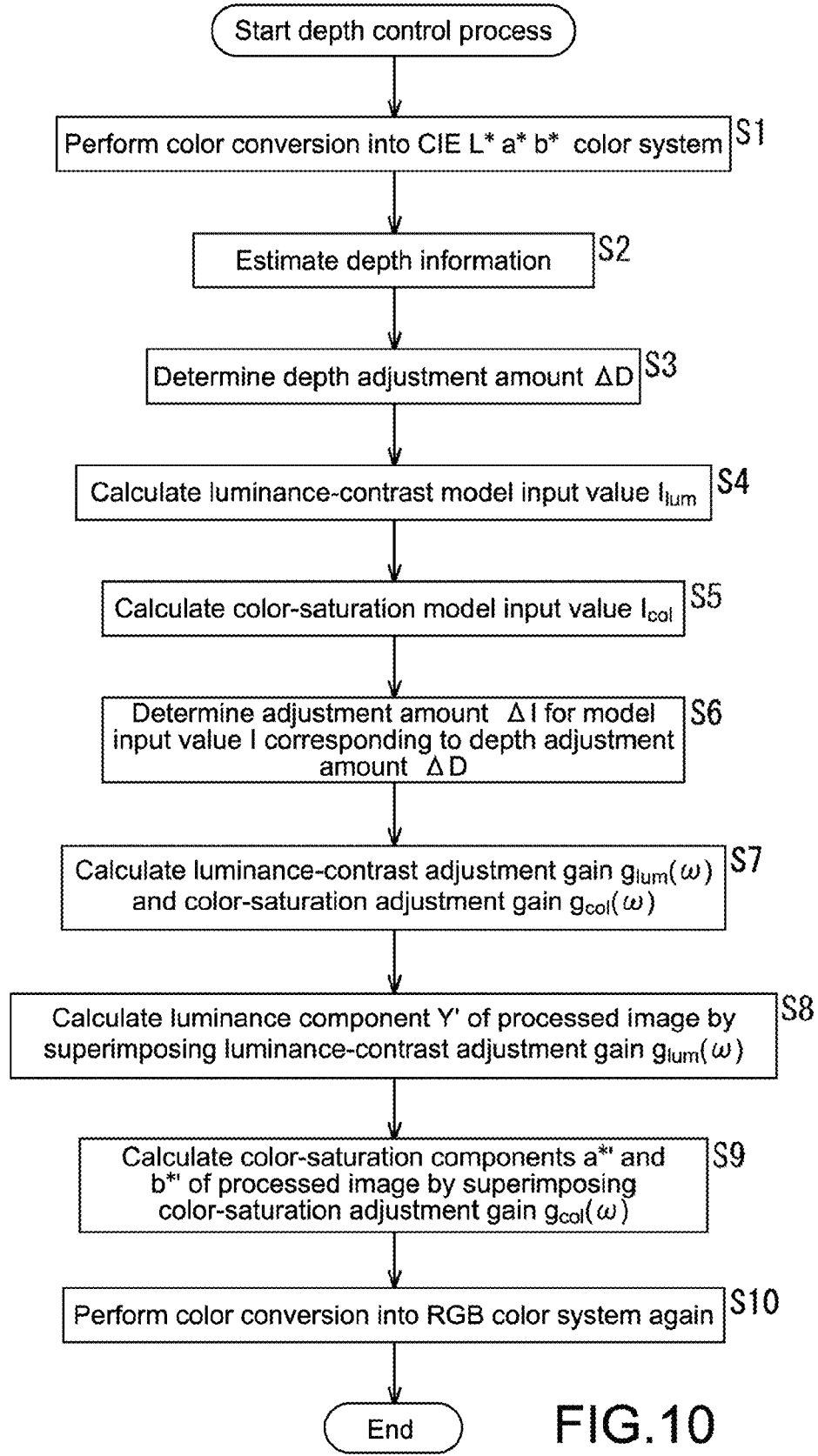
FIG. 10 is a flowchart of a depth control process.

The depth control process by the image processing apparatus 1 in the second embodiment is performed similarly to that in the first embodiment described by referring to FIG. 10 except that the luminance component Y' is not processed.

As described above, with the image processing apparatus 1 in the second embodiment, depth control is performed by adjusting only the color saturation of an original image. This allows adjustment of the image sharpness, and realizes depth control without degrading the image quality.

Note that the image processing apparatus 1 may be configured as both in the first and second embodiments described above, and may selectively adjust the depth amount based only on the color saturation of an original image or based both on the color saturation and the luminance contrast of the original image.

In the above, described is the example of performing continuous Fourier transform for conversion into a spatial frequency domain or for inverse conversion into an image domain. With discrete Fourier transform, Equations 24 to 26 above are respectively represented by Equations 30 to 32 below.

[Math. 23]

$$f(u, v) = \frac{1}{MN} \sum_{k=0}^{M-1} \sum_{l=0}^{N-1} f(k, l) W_M^{kx} W_N^{ly} \tag{30}$$

where, $k = 0, 1, 2, \ldots, M-1 \quad u = 0, 1, 2, \ldots, M-1$
$l = 0, 1, 2, \ldots, N-1 \quad v = 0, 1, 2, \ldots, N-1$
$W_M = e^{-2j\pi/M} \quad W_N = e^{-2j\pi/N}$ $$f'(u, v) = f(u, v) \cdot g(x, y) \tag{31}$$

$$f(k, l) = \sum_{k=0}^{M-1} \sum_{l=0}^{N-1} f(u, v) W_M^{-kx} W_N^{-ly} \tag{32}$$

[3. Third Embodiment]
[Exemplary Depth Control with Respect to 2D Image]

In the embodiments described above, described is the example in which an input image is a 3D image to let a viewer perceive that the image is 3D.

However, the present disclosure is applicable not only to such a 3D image but also to an ordinary 2D image. Therefore, described below is an example of adjusting a depth amount by controlling a 2D image in terms of luminance and color-saturation components (or only a color-saturation component).

For adjusting the depth amount of a 2D image, if the depth amount is analyzable for each pixel in the 2D image, the data format thereof becomes equivalent to the third data format of a 3D image, i.e., a combination of a 2D image with depth information thereabout. The depth amount of the 2D image becomes thus available for adjustment.

Therefore, described below is about calculation of the depth amount of a 2D image by the depth estimation section 12.

First of all, the depth estimation section 12 detects the frame-to-frame motion of a 2D object image using a predetermined technique for motion detection such as block matching.

Figure 20:
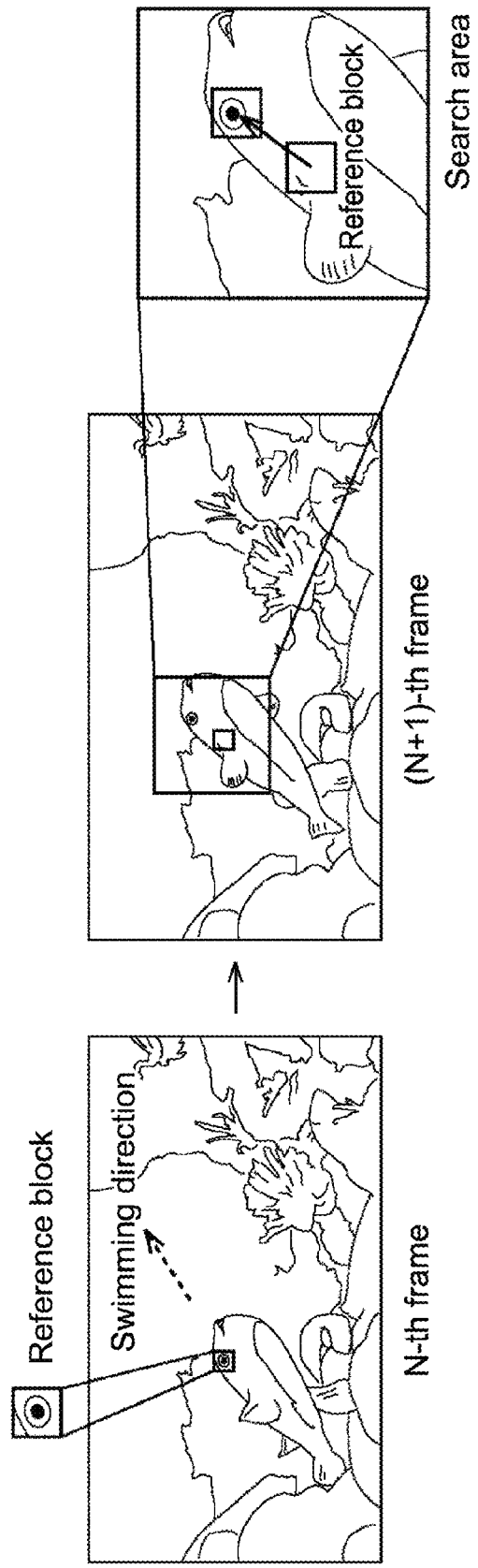
FIG. 20 is a diagram illustrating block matching.
Figure 21:
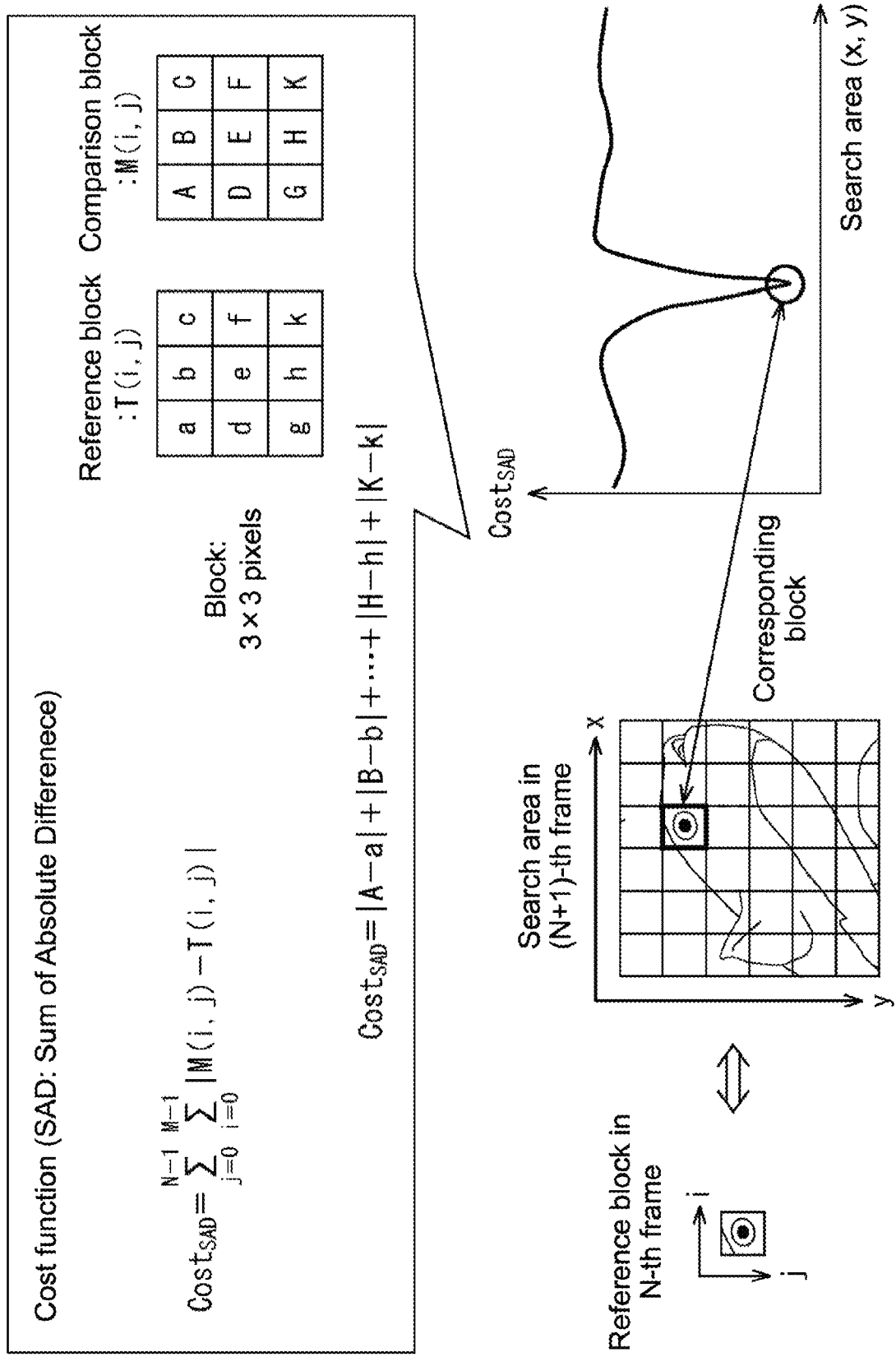
FIG. 21 is another diagram illustrating the block matching.

FIGS. 20 and 21 are each a diagram for illustrating the block matching.

With the block matching, as shown in FIG. 20, a predetermined block around a target pixel, e.g., a block with 3×3 pixels, is defined as a reference block. Herein, the target pixel is each pixel in an N-th frame.

Next, a predetermined search area around a pixel in the (N+1)-th frame corresponding to the target pixel is searched to find a corresponding block being most analogous to the reference block.

For a search of the corresponding block, a cost function below is used, for example.

[Math. 24]

$$\text{Cost}_{SAD} = \sum_{j=0}^{N-1} \sum_{i=0}^{M-1} |M(i, j) - T(i, j)| \quad (33)$$

The cost function $\text{Cost}_{SAD}$ is represented by the sum of absolute differences of any two corresponding pixels in the reference block in the N-th frame and a comparison block in the search area in the (N+1)-th frame. As shown in FIG. 21, the cost function $\text{Cost}_{SAD}$ is reduced with a higher degree of analogousness between the blocks. Accordingly, among a plurality of comparison blocks in the search area, the comparison block with which the cost function $\text{Cost}_{SAD}$ takes the smallest value may be detected to find a block corresponding to the reference block, thereby being able to detect the motion of an object.

For detecting the motion of the object, the block matching is not the only option, and any other techniques are also possible, e.g., gradient method, or Structure From Motion.

After the motion of the object is detected in the 2D image, the depth estimation section 12 may detect the depth amount for each pixel in the 2D image based on the detected motion of the object. This detection is performed under the rules that "an object positioned toward the front looks like moving at a faster speed", and "an object moved a longer distance exists closer to the front".

Note that such motion detection is not the only option for use as a basis to calculate the depth amount in a 2D image. Alternatively, an image may be subjected to structural analysis by segmentation to determine the 3D shape thereof, and based on the result, the depth amount may be calculated.

[Application Example to Computer]

The series of processes described above may be performed by hardware or software. For the software to perform the series of processes, a program in the software is installed on a computer. Herein, the computer includes a computer in a hardware specifically designed therefor, or a general-purpose personal computer that may perform various functions by installation of various programs, for example.

Figure 22:
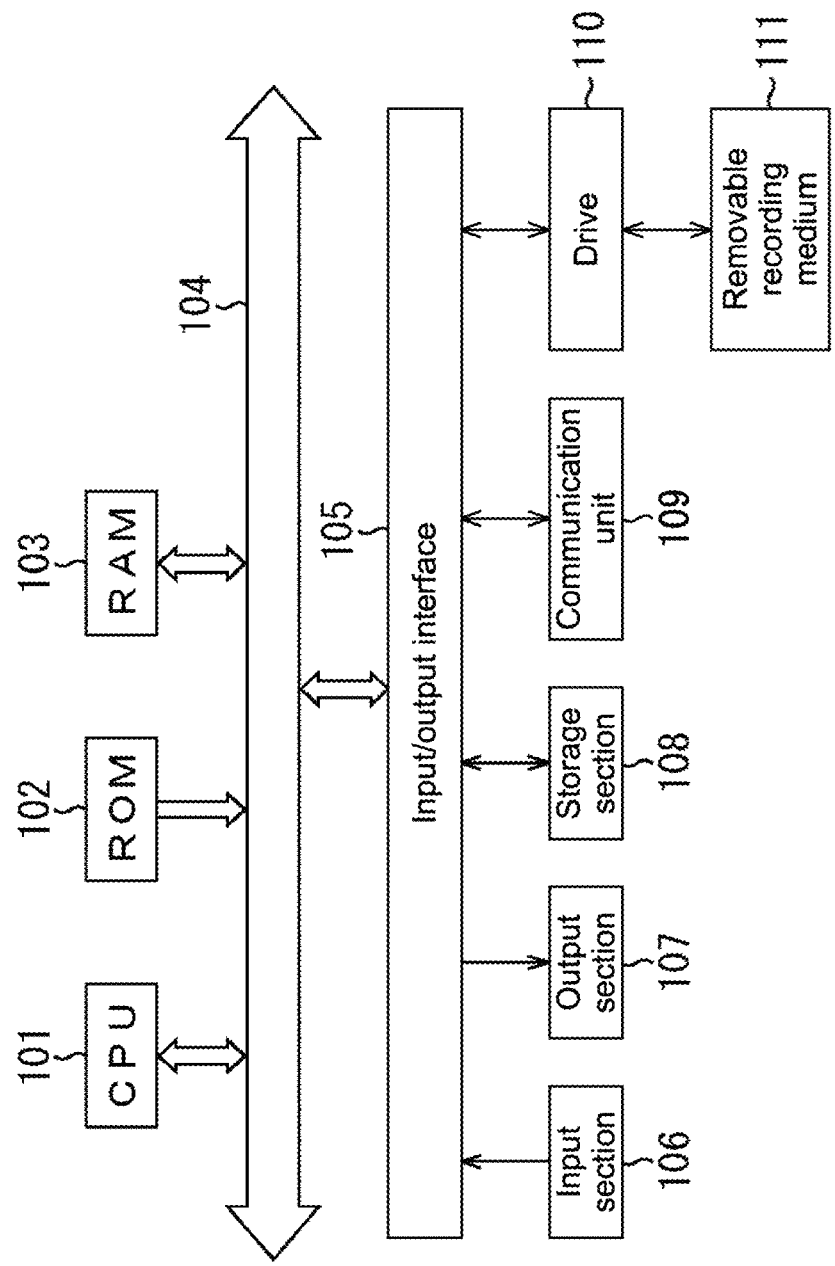
FIG. 22 is a block diagram showing an exemplary configuration of a computer according to an embodiment of the present disclosure.

FIG. 22 is a block diagram showing an exemplary hardware configuration of a computer that performs the series of processes described above by running a program.

In the computer, a bus 104 connects together a CPU (Central Processing Unit) 101, a ROM (Read Only Memory) 102, and a RAM (Random Access Memory) 103.

The bus 104 is also connected with an input/output interface 105. The input/output interface 105 is connected with an input section 106, an output section 107, a storage section 108, a communication unit 109, and a drive 110.

The input section 106 includes a keyboard, a mouse, a microphone, or others, and the output section 107 includes a display, a speaker, or others. The storage section 108 is a hard disk, or a nonvolatile memory, for example. The communication unit 109 is a network interface, for example. The drive 110 drives a removable medium 111 exemplified by a magnetic disk, an optical disk, a magneto-optical disk, a semiconductor memory, or others.

With the computer in the above configuration, the series of processes described above are performed by the CPU 101 loading the program in the storage section 108 onto the RAM 103 for running via the input/output interface 105 and the bus 104, for example.

The program to be run by the computer may be installed on the storage section 108 via the input/output interface 105 by mounting the removable recording medium 111 to the drive 110. The program may be installed on the storage section 108 by being received by the communication unit 109 via a wired or wireless transmission medium including a local area network, the Internet, digital satellite broadcasting, or others. The program may be also installed in advance on the ROM 102 or the storage section 108.

The foregoing description of the embodiments of the present disclosure is in all aspects illustrative and not restrictive. It is understood that numerous other modulations and variations may be devised without departing from the scope of the present disclosure.

As an example, the embodiments described above may be entirely or partially combined together for use.

The present disclosure is applicable to cloud computing with which a plurality of apparatuses are connected through a network for processing by sharing and collaboration of a function.

The steps in the flowchart described above may be performed by one apparatus or by a plurality of apparatuses by sharing.

When one step includes various types of processes, the various types of processes in the step may be performed by one apparatus or by a plurality of apparatuses by sharing.

Further, the effect described in this Specification is by way of example and is not restrictive, and any other effect may also be produced.

The present disclosure may be also in the following structures.

(1) An image processing apparatus, including:
a depth-adjustment-amount determination section configured to determine a depth adjustment amount of an input image;
an evaluation function storage section configured to store an evaluation function, the evaluation function representing a relationship of a subjective depth amount of the image to a color-saturation component thereof, the subjective depth amount being a depth amount subjectively felt by a user;
an input-value-adjustment-amount determination section configured to determine an input-value adjustment amount based on the evaluation function, the input-value adjustment amount representing a retina's response to the color-saturation component corresponding to the determined depth adjustment amount;
an adjustment gain calculation section configured to calculate each spatial-frequency-component adjustment gain based on the determined input-value adjustment amount; and
a gain superimposition section configured to superimpose each of the spatial-frequency-component adjustment gains on the color-saturation component of the input image, the spatial-frequency-component adjustment gains being calculated by the adjustment gain calculation section.

(2) The image processing apparatus according to (1), in which the evaluation function storage section stores the evaluation function, the evaluation function representing not only the relationship of the subjective depth amount to the color-saturation component but also to a luminance-contrast component of the image, in addition to the input-value adjustment amount representing the retina's response to the color-saturation component, the input-value-adjustment-amount determination section determines another input-value adjustment amount based on the evaluation function, the input-value-adjustment amount representing a retina's response to a luminance-contrast component corresponding to the determined depth adjustment amount, for each of the luminance-contrast component and the color-saturation component, the adjustment gain calculation section calculates each of the spatial-frequency-component adjustment gains based on the input-value adjustment amounts, and for each of the luminance-contrast component and the color-saturation component, the gain superimposition section superimposes each of the spatial-frequency-component adjustment gains on the input image, the spatial-frequency-component adjustment gains being calculated by the adjustment gain calculation section.

(3) The image processing apparatus according to (2), in which the input-value-adjustment-amount determination section includes a parameter for setting an adjustment balance between the luminance-contrast component and the color-saturation component, and with the adjustment balance set by the parameter, determines the input-value adjustment amounts representing the retina's response to the luminance-contrast component and to the color-saturation component.

(4) The image processing apparatus according to (2) or (3), in which the evaluation function representing the relationship of the subjective depth amount to the color-saturation component and to the luminance-contrast component satisfies

[Math. 25]

$$D(I_{lum}, I_{col}) = \begin{cases} D_{lum} + B, D_{col} < D_{lum} \\ D_{col} + B, D_{col} \geq D_{lum} \end{cases}$$

$$D_{lum} = A_{lum}\log_{10}I_{lum}, D_{col} = A_{col}\log_{10}I_{col}$$

where $I_{col}$ denotes the color-saturation component, $I_{lum}$ denotes the luminance-contrast component, $D_{c01}$ denotes the subjective depth amount for the color-saturation component, $D_{lum}$ denotes the subjective depth amount for the luminance-contrast component, and $D(I_{lum}, I_{col})$ denotes the subjective depth amount in combination of the color-saturation component and the luminance-contrast component ($A_{lum}$, $A_{col}$, and B are each a given constant).

(5) The image processing apparatus according to (2) or (3), in which the evaluation function representing the relationship of the subjective depth amount to the color-saturation component and to the luminance-contrast component satisfies $$D(I_{lum}, I_{col}) = ((A_{lum}\log_{10}I_{lum})^n + (A_{col}\log_{10}I_{col})^n)^{1/n} + B \quad \text{[Math. 26]}$$

where $I_{col}$ denotes the color-saturation component, $I_{lum}$ denotes the luminance-contrast component, and $D(I_{lum}, I_{col})$ denotes the subjective depth amount in combination of the color-saturation component and the luminance-contrast component ($A_{lum}$, $A_{col}$, and B are each a given constant).

(6) The image processing apparatus according to (1), in which the evaluation function representing the relationship of the subjective depth amount to the color-saturation component satisfies $$D_{col} = A_{col}\log_{10}I_{col} + B_{col}$$

where $I_{col}$ denotes the color-saturation component, and $D_{col}$ denotes the subjective depth amount ($A_{col}$ and $B_{col}$ are each a given constant).

(7) The image processing apparatus according to any one of (1) to (6), in which the input image is a three-dimensional (3D) image.

(8) The image processing apparatus according to (7), in which the 3D image is input as a stereo image including a right-eye image and a left-eye image.

(9) The image processing apparatus according to (7), in which the 3D image is input as a multi-view image including three or more images viewed from three or more positions.

(10) The image processing apparatus according to (7), in which the 3D image is input in a data format being a combination of a two-dimensional (2D) image and depth information thereabout.

(11) The image processing apparatus according to any one of (1) to (6), in which the input image is a 2D image.

(12) The image processing apparatus according to any one of (1) to (11), further including a color conversion section configured to convert a color system of the input image from RGB to CIE L*a*b*.

(13) The image processing apparatus according to any one of (1) to (12), further including a depth information estimation section configured to estimate depth information from the input image, and a depth-adjustment-amount defining function storage section configured to store a depth-adjustment-amount defining function defining a depth adjustment amount with respect to the depth information, wherein the depth-adjustment-amount determination section determines the depth adjustment amount using the estimated depth information based on the depth-adjustment-amount defining function.

(14) The image processing apparatus according to (13), in which when the input image is a 2D image, the depth information estimation section estimates the depth information based on an analysis result of the 2D image.

(15) The image processing apparatus according to any one of (1) to (14), further including a spatial frequency weight setting section configured to set a function of a weight of each of the spatial-frequency-component adjustment gains, wherein the adjustment gain calculation section calculates the adjustment gains by multiplying the input-value adjustment amount by the function.

(16) The image processing apparatus according to any one of (1) to (15), in which the gain superimposition section converts the input image into a frequency domain, and converts a result of convolution integral back into an image domain, the result of convolution integral being obtained by performing the convolution integral between the frequency-domain image and each of the spatial-frequency-component adjustment gains.

(17) The image processing apparatus according to (16), in which
the gain superimposition section converts the input image into the frequency domain by Fourier transform, and converts the frequency-domain image back into the image domain by inverse Fourier transform.

(18) The image processing apparatus according to any one of (1) to (17), in which
when the depth adjustment amount is positive, the input-value adjustment amount determined by the input-value-adjustment-amount determination section is also positive, and when the depth adjustment amount is negative, the input-value adjustment amount determined by the input-value-adjustment-amount determination section is also negative.

(19) An image processing method, including:
by an image processing apparatus configured to process an input image
determining a depth adjustment amount of an input image;
determining an input-value adjustment amount based on the evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount;
calculating each spatial-frequency-component adjustment gain based on the determined input-value adjustment amount; and
superimposing each of the calculated spatial-frequency-component adjustment gains on the color-saturation component of the input image.

(20) A program causing a computer to function as:
a depth-adjustment-amount determination section configured to determine a depth adjustment amount of an input image;
an input-value-adjustment-amount determination section configured to determine an input-value adjustment amount based on the evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount;
an adjustment gain calculation section configured to calculate each spatial-frequency-component adjustment gain based on the determined input-value adjustment amount; and
a gain superimposition section configured to superimpose each of the calculated spatial-frequency-component adjustment gains on the color-saturation component of the input image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a depth-adjustment-amount determination section configured to determine a depth adjustment amount of an input image;
an evaluation function storage section configured to store an evaluation function, the evaluation function representing a relationship of a subjective depth amount of the image to a color-saturation component thereof, the subjective depth amount being a depth amount subjectively felt by a user;
an input-value-adjustment-amount determination section configured to determine an input-value adjustment amount based on the evaluation function, the input-value adjustment amount representing a retina's response to the color-saturation component corresponding to the determined depth adjustment amount;
an adjustment gain calculation section configured to calculate each spatial-frequency-component adjustment gain based on the determined input-value adjustment amount; and
a gain superimposition section configured to superimpose each of the spatial-frequency-component adjustment gains on the color-saturation component of the input image, the spatial-frequency-component adjustment gains being calculated by the adjustment gain calculation section.

2. The image processing apparatus according to claim 1, wherein
the evaluation function storage section stores the evaluation function, the evaluation function representing not only the relationship of the subjective depth amount to the color-saturation component but also to a luminance-contrast component of the image,
in addition to the input-value adjustment amount representing the retina's response to the color-saturation component, the input-value-adjustment-amount determination section determines another input-value adjustment amount based on the evaluation function, the input-value-adjustment amount representing a retina's response to a luminance-contrast component corresponding to the determined depth adjustment amount,
for each of the luminance-contrast component and the color-saturation component, the adjustment gain calculation section calculates each of the spatial-frequency-component adjustment gains based on the input-value adjustment amounts, and
for each of the luminance-contrast component and the color-saturation component, the gain superimposition section superimposes each of the spatial-frequency-component adjustment gains on the input image, the spatial-frequency-component adjustment gains being calculated by the adjustment gain calculation section.

3. The image processing apparatus according to claim 2, wherein
the input-value-adjustment-amount determination section includes a parameter for setting an adjustment balance between the luminance-contrast component and the color-saturation component, and with the adjustment balance set by the parameter, determines the input-value adjustment amounts representing the retina's response to the luminance-contrast component and to the color-saturation component.

4. The image processing apparatus according to claim 2, wherein
the evaluation function representing the relationship of the subjective depth amount to the color-saturation component and to the luminance-contrast component satisfies $$D(l_{lum}, l_{col}) = \begin{cases} D_{lum} + B, D_{col} < D_{lum} \\ D_{col} + B, D_{col} \geq D_{lum} \end{cases}$$

$$D_{lum} = A_{lum}\log_{10} l_{lum}, D_{col} = A_{col}\log_{10} l_{col}$$

$D_{lum}=A_{lum} \log_{10}I_{lum}, D_{col}=A_{col} \log_{10}I_{col}$ where $l_{col}$ denotes the color-saturation component, $l_{lum}$ denotes the luminance-contrast component, $D_{col}$ denotes the subjective depth amount for the color-saturation component, $D_{lum}$ denotes the subjective depth amount for the luminance-contrast component, and $D(l_{lum},l_{col})$ denotes the subjective depth amount in combination of the color-saturation component and the luminance-contrast component ($A_{lum}$, $A_{col}$ and B are each a given constant).

5. The image processing apparatus according to claim 2, wherein
the evaluation function representing the relationship of the subjective depth amount to the color-saturation component and to the luminance-contrast component satisfies $$D(I_{lum}, I_{col}) = ((A_{lum} \log_{10} I_{lum})^n + (A_{col} \log_{10} I_{col})^n)^{1/n} + B$$

where $l_{col}$ denotes the color-saturation component, $l_{lum}$ denotes the luminance-contrast component, and $D(l_{lum},l_{col})$ denotes the subjective depth amount in combination of the color-saturation component and the luminance-contrast component ($A_{lum}$, $A_{col}$ and B are each a given constant).

6. The image processing apparatus according to claim 1, wherein
the evaluation function representing the relationship of the subjective depth amount to the color-saturation component satisfies $$D_{col} = A_{col} \log_{10} I_{col} + B_{col}$$

where $I_{col}$ denotes the color-saturation component, and $D_{col}$ denotes the subjective depth amount ($A_{col}$ and $B_{col}$ are each a given constant).

7. The image processing apparatus according to claim 1, wherein
the input image is a three-dimensional (3D) image.

8. The image processing apparatus according to claim 7, wherein
the 3D image is input as a stereo image including a right-eye image and a left-eye image.

9. The image processing apparatus according to claim 7, wherein
the 3D image is input as a multi-view image including three or more images viewed from three or more positions.

10. The image processing apparatus according to claim 7, wherein
the 3D image is input in a data format being a combination of a two-dimensional (2D) image and depth information thereabout.

11. The image processing apparatus according to claim 1, wherein
the input image is a 2D image.

12. The image processing apparatus according to claim 1, further comprising
a color conversion section configured to convert a color system of the input image from RGB to CIE L*a*b*.

13. The image processing apparatus according to claim 1, further comprising:

a depth information estimation section configured to estimate depth information from the input image; and
a depth-adjustment-amount defining function storage section configured to store a depth-adjustment-amount defining function defining a depth adjustment amount with respect to the depth information, the depth-adjustment-amount determination section determining the depth adjustment amount using the estimated depth information based on the depth-adjustment-amount defining function.

14. The image processing apparatus according to claim 13, wherein
when the input image is a 2D image, the depth information estimation section estimates the depth information based on an analysis result of the 2D image.

15. The image processing apparatus according to claim 1, further comprising
a spatial frequency weight setting section configured to set a function of a weight of each of the spatial-frequency-component adjustment gains, the adjustment gain calculation section calculating the adjustment gains by multiplying the input-value adjustment amount by the function.

16. The image processing apparatus according to claim 1, wherein
the gain superimposition section converts the input image into a frequency domain, and converts a result of convolution integral back into an image domain, the result of convolution integral being obtained by performing the convolution integral between the frequency-domain image and each of the spatial-frequency-component adjustment gains.

17. The image processing apparatus according to claim 16, wherein
the gain superimposition section converts the input image into the frequency domain by Fourier transform, and converts the frequency-domain image back into the image domain by inverse Fourier transform.

18. The image processing apparatus according to claim 1, wherein
when the depth adjustment amount is positive, the input-value adjustment amount determined by the input-value-adjustment-amount determination section is also positive, and when the depth adjustment amount is negative, the input-value adjustment amount determined by the input-value-adjustment-amount determination section is also negative.

19. An image processing method, comprising:
by an image processing apparatus configured to process an input image
determining a depth adjustment amount of an input image;
determining an input-value adjustment amount based on an evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount;
calculating each spatial-frequency-component adjustment gain based on the determined input-value adjustment amount; and
superimposing each of the calculated spatial-frequency-component adjustment gains on the color-saturation component of the input image.

20. At least one non-transitory computer-readable storage medium having encoded thereon executable instructions that, when executed by at least one processor, cause the at least one processor to carry out a method comprising:
- determining a depth adjustment amount of an input image;
- determining an input-value adjustment amount based on an evaluation function, the evaluation function representing a relationship of a subjective depth amount to a color-saturation component of the image, the subjective depth amount being a depth amount subjectively felt by a user, the input-value adjustment amount representing a retina's response to the color-saturation component corresponding to the determined depth adjustment amount;
- calculating each spatial-frequency-component adjustment gain based on the determined input-value adjustment amount; and
- superimposing each of the calculated spatial-frequency-component adjustment gains on the color-saturation component of the input image.

* * * * *